(12) United States Patent
Park et al.

(10) Patent No.: US 12,353,335 B2
(45) Date of Patent: Jul. 8, 2025

(54) SEMICONDUCTOR DEVICE AND METHOD OF OPERATING THE SAME

(71) Applicant: SAMSUNG ELECTRONICS CO., LTD., Suwon-si (KR)

(72) Inventors: Sohyun Park, Suwon-si (KR); Yunho Youm, Osan-si (KR); Myungsik Choi, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 378 days.

(21) Appl. No.: 17/895,303

(22) Filed: Aug. 25, 2022

(65) Prior Publication Data

US 2023/0153252 A1 May 18, 2023

(30) Foreign Application Priority Data

Nov. 15, 2021 (KR) .................. 10-2021-0156961
Jan. 4, 2022 (KR) .................. 10-2022-0000883

(51) Int. Cl.

| | | |
|---|---|---|
| G06F 12/14 | (2006.01) | |
| G11C 17/16 | (2006.01) | |
| G11C 17/18 | (2006.01) | |
| H03K 19/20 | (2006.01) | |
| H10B 20/25 | (2023.01) | |
| G11C 16/04 | (2006.01) | |

(52) U.S. Cl.
CPC .......... *G06F 12/1466* (2013.01); *G11C 17/16* (2013.01); *G11C 17/18* (2013.01); *G06F 2212/1052* (2013.01); *G11C 16/0483* (2013.01); *H03K 19/20* (2013.01); *H10B 20/25* (2023.02)

(58) Field of Classification Search
CPC ......... G06F 12/1466; G06F 2212/1052; G06F 11/26; G06F 11/3055; G06F 11/3648; G06F 21/72; G06F 21/79; G11C 17/16; G11C 17/18; G11C 16/0483; G11C 17/08; H03K 19/20; H10B 20/20; H10B 20/25; H04L 9/0897
See application file for complete search history.

(56) References Cited

U.S. PATENT DOCUMENTS

| | | |
|---|---|---|
| 8,190,920 B2 | 5/2012 | Matthews, Jr. |
| 8,594,333 B2 | 11/2013 | Ducharme et al. |
| 8,745,412 B2 | 6/2014 | Sun et al. |
| 8,781,127 B2 | 7/2014 | Ducharme et al. |

(Continued)

FOREIGN PATENT DOCUMENTS

| | | |
|---|---|---|
| EP | 2381672 A1 | 10/2011 |
| EP | 2506176 A1 | 10/2012 |

*Primary Examiner* — Mohammed Waliullah
(74) *Attorney, Agent, or Firm* — Fish & Richardson P.C.

(57) ABSTRACT

A semiconductor device includes a one-time programmable (OTP) memory device, a key register and a key protection control logic. The OTP memory device stores a secret value, a key protection bit indicating whether to protect the secret value, and an end of life bit indicating whether to discard the semiconductor device. The key register loads the secret value from the OTP memory device and stores the secret value. The key protection control logic controls loading of the secret value from the OTP memory device to the key register based on the key protection bit and the end of life bit. Security of the secret value is enhanced and utilization of the secret value is optimized using the key protection bit and the end of life bit.

19 Claims, 18 Drawing Sheets

(56) References Cited

U.S. PATENT DOCUMENTS

| | | | |
|---|---|---|---|
| 8,811,497 B2 | 8/2014 | Stewart | |
| 9,058,297 B2 | 6/2015 | Ducharme et al. | |
| 9,317,449 B2 | 4/2016 | Ducharme et al. | |
| 9,432,184 B2 | 8/2016 | Zheng et al. | |
| 9,501,429 B2 | 11/2016 | Zheng et al. | |
| 9,633,180 B2 | 4/2017 | Stewart | |
| 10,878,099 B2* | 12/2020 | Wu | G06F 9/30098 |
| 10,923,203 B2 | 2/2021 | Park et al. | |
| 2008/0232151 A1* | 9/2008 | Ahmed | G11C 17/18 |
| | | | 365/96 |
| 2010/0303239 A1 | 12/2010 | James et al. | |
| 2014/0016776 A1 | 1/2014 | Van Foreest et al. | |
| 2018/0189493 A1* | 7/2018 | Schilder | G01R 31/31719 |
| 2019/0214102 A1* | 7/2019 | Park | G06F 21/79 |
| 2021/0075609 A1* | 3/2021 | Li | H04L 9/0618 |
| 2021/0091952 A1* | 3/2021 | Wentz | H04L 9/3278 |

\* cited by examiner

FIG. 5

|  | EOL (OTP) | PRT (OTP) | LDP | REN |
|---|---|---|---|---|
| STG1 | 0 | 0 | L/H | H |
| STG2 |  | 1 | H | H |
| STG2 |  | 1 | L | L |
| STG3 | 1 | 0/1 | L/H | L |

FIG. 12

| | EOL (OTP) | PRT (OTP) | DBG | RLK | LDR | REN |
|---|---|---|---|---|---|---|
| STG1 | 0 | 0 | L/H | L/H | L/H | H |
| STG2 | 0 | 1 | L | L | H | H |
| | | | L | H | L | L |
| | | | H | L | L | L |
| | | | H | H | L | L |
| STG3 | 1 | 0/1 | L/H | | | L |

SEMICONDUCTOR DEVICE AND METHOD OF OPERATING THE SAME

CROSS-REFERENCE TO RELATED APPLICATION

This U.S. non-provisional application claims priority under 35 USC § 119 to Korean Patent Application No. 10-2021-0156961 filed on Nov. 15, 2021 and Korean Patent Application No. 10-2022-0000883 filed on Jan. 4, 2022, in the Korean Intellectual Property Office (KIPO), the disclosures of which are incorporated by reference herein in their entirety.

BACKGROUND

1. Technical Field

Exemplary embodiments relate generally to semiconductor integrated circuits, and more particularly to a semiconductor device and a method of operating a semiconductor device.

2. Discussion of the Related Art

A semiconductor device capable of executing security software, including a secure application for authentication, etc., stores a key therein and permanently programs the key used by the security software. For example, during a process of fabricating a chip or chipset to be mounted on the semiconductor device, a value of a key may be fused in an element such as, for example, a one-time programmable (OTP) memory included in the semiconductor device.

However, when a chip is distributed to an unknown place or a product is developed using the chip after the fabrication process is completed, a non-authorized third party may access the key that is fused in the chip without permission and may leak the key.

SUMMARY

Some exemplary embodiments may provide a semiconductor device and a method of operating such a semiconductor device, capable of enhancing the security of a secret value used in the semiconductor device.

According to exemplary embodiments, a semiconductor device includes a one-time programmable (OTP) memory device, a key register and a key protection control logic. The OTP memory device stores a secret value, a key protection bit indicating whether to protect the secret value, and an end of life bit indicating whether to discard the semiconductor device. The key register loads the secret value from the OTP memory device and stores the secret value. The key protection control logic controls loading of the secret value from the OTP memory device to the key register based on the key protection bit and the end of life bit.

According to exemplary embodiments, a semiconductor device includes a one-time programmable (OTP) memory device configured to store a secret value, a key protection bit indicating whether to protect the secret value, and an end of life bit indicating whether to discard the semiconductor device, a key register configured to load the secret value from the OTP memory device and store the secret value, and a key protection control logic configured to control loading of the secret value from the OTP memory device to the key register based on the key protection bit, the end of life bit and a loading permission signal indicating an operation state of the semiconductor device. The key protection bit and the end of life bit are sequentially programmed depending on a life cycle of the semiconductor device.

According to exemplary embodiments, a method of operating an semiconductor device, includes, storing, in a one-time programmable (OTP) memory device, a secret value, a key protection bit indicating whether to protect the secret value, and an end of life bit indicating whether to discard the semiconductor device, loading the secret value from the OTP memory device to store the secret value in a key register, and controlling loading of the secret value from the OTP memory device to the key register based on the key protection bit and the end of life bit.

The semiconductor device and the method of operating the semiconductor device according to exemplary embodiments may enhance security of the secret value and simultaneously optimize utilization of the secret value, using the key protection bit and the end of life bit that are stored in the OTP memory device. Furthermore, various security policies may be applicable and the secret value may be protected at the hardware level against undesirable exposure after the semiconductor device is discarded.

BRIEF DESCRIPTION OF THE DRAWINGS

Exemplary embodiments of the present disclosure will be more clearly understood from the following detailed description taken in conjunction with the accompanying drawings.

FIG. 5 is a diagram illustrating an operation of the key protection control logic of FIG. 4.

FIG. 12 is a diagram illustrating an operation of the key protection control logic of FIG. 10.

DETAILED DESCRIPTION OF THE PREFERRED EMBODIMENTS

Figure 1:
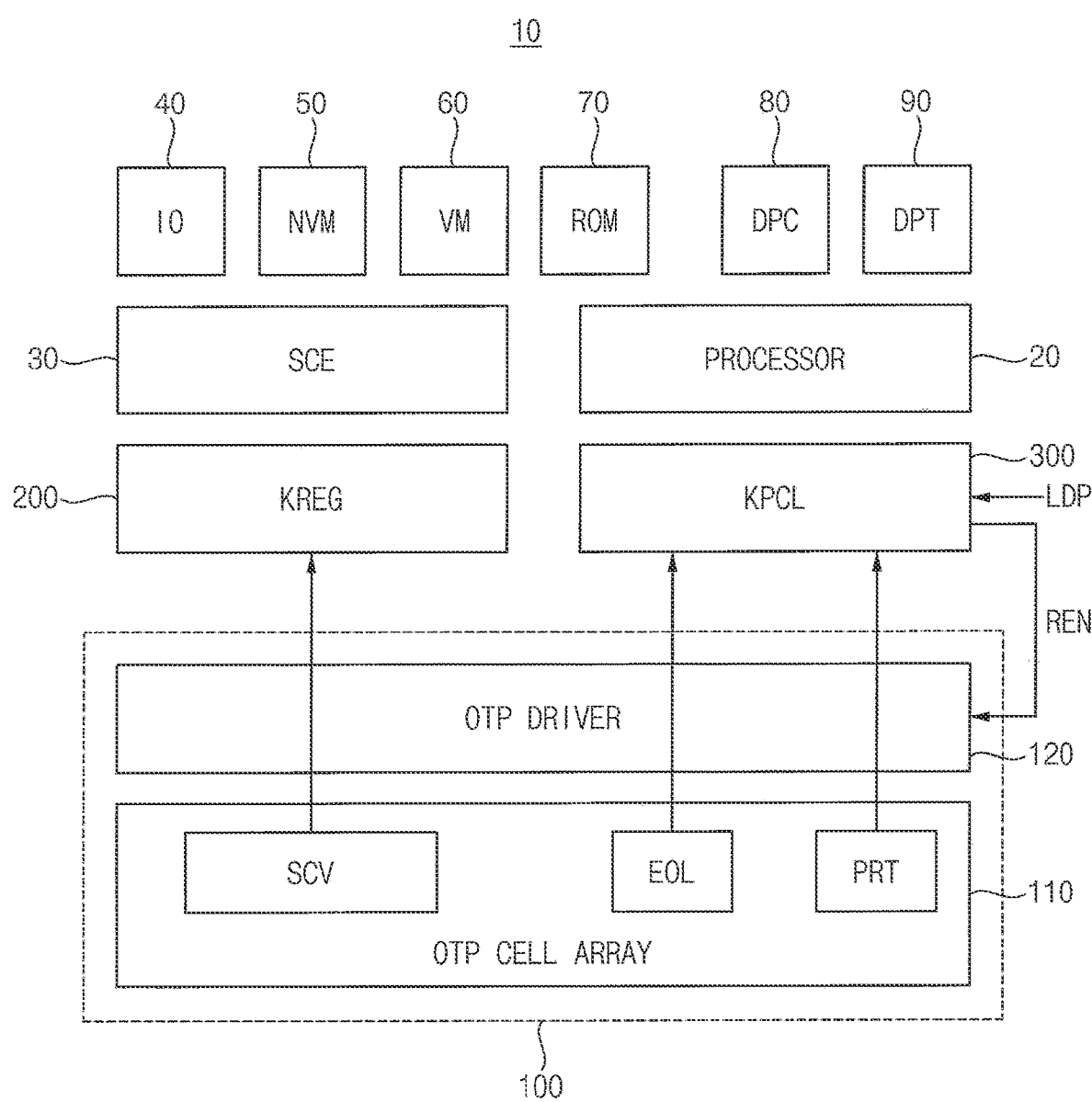
FIG. 1 is a semiconductor device according to exemplary embodiments.

Various exemplary embodiments will be described more fully hereinafter with reference to the accompanying drawings, in which some exemplary embodiments are shown. In the drawings, like numerals refer to like elements throughout. Repeated descriptions may be omitted as redundant.

Figure 2:
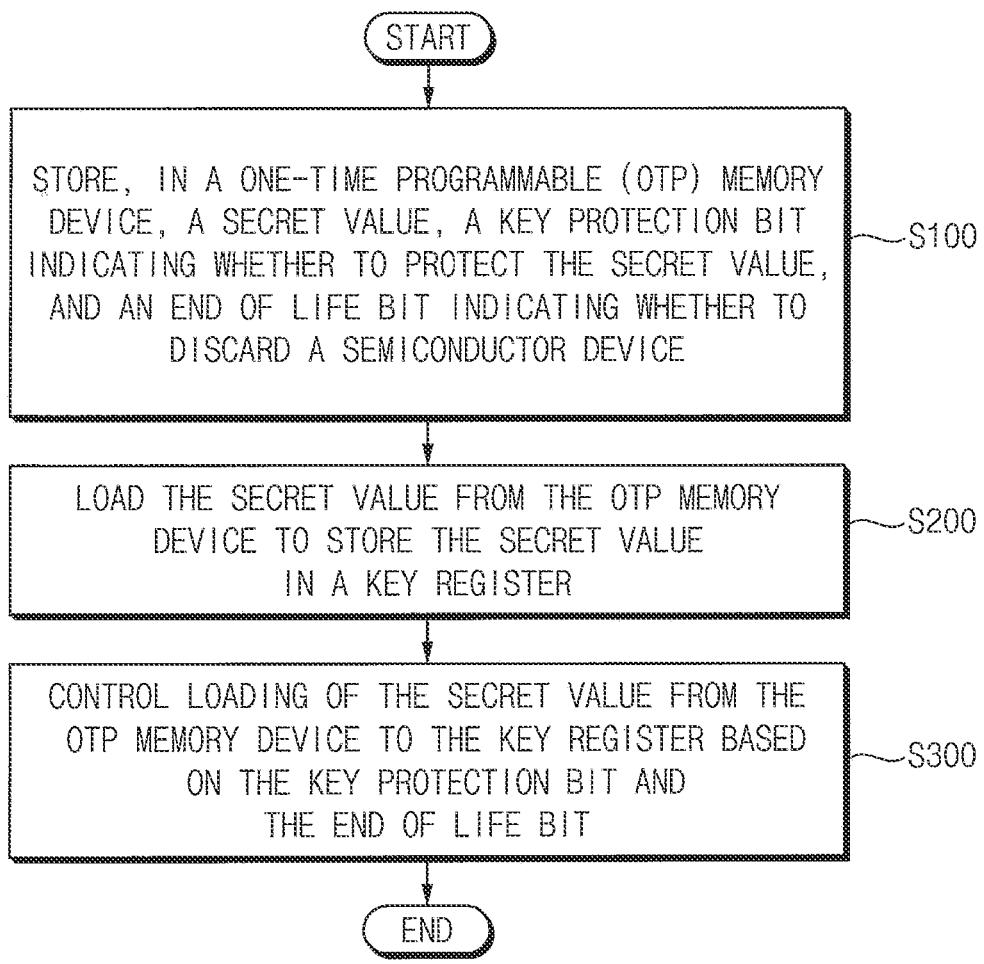
FIG. 2 is a flowchart illustrating a method of operating a semiconductor device according to exemplary embodiments.

FIG. 1 is a semiconductor device according to exemplary embodiments, and FIG. 2 is a flowchart illustrating a method of operating a semiconductor device according to such exemplary embodiments.

Referring to FIG. 1, a semiconductor device 10 may include a one-time programmable (OTP) memory device 100, a key register KREG 200 and a key protection control logic KPCL 300. In addition, the semiconductor device 10 may further include various elements for performing unique functions of the semiconductor device 10. For example, the semiconductor device 10 may include at least one processor 20, a security circuit SCE 30, an input-output device IO 40, a nonvolatile memory device NVM 50, a volatile memory device VM 60, a read only memory (ROM) 70, a debugging port protection logic DPC 80, a debugging port DPT 90, and so on.

Referring to FIGS. 1 and 2, the OTP memory device 100 may store a secret value SCV, a key protection bit PRT indicating whether to protect the secret value SCV, and an end of life bit EOL indicating whether to discard the semiconductor device 10 (S100). As will be described below with reference to FIG. 3, the semiconductor device 10 may sequentially program the key protection bit PRT and the end of life bit EOL depending on a life cycle of the semiconductor device 10, under control of an external host device.

The OTP memory device 100 may include an OTP cell array 110 and an OTP driver 120. Configuration and operation of the OTP memory device 100 will be further described below with reference to FIGS. 13 through 17.

The key register 200 may load the secret value SCV from the OTP memory device 100 and store the secret value SCV (S200). The key protection control logic 300 may control loading of the secret value SCV from the OTP memory device 100 to the key register 200 based on the key protection bit PRT and the end of life bit EOL (S300).

In some exemplary embodiments, the key protection control logic 300 may generate a read enable signal REN based on the key protection bit PRT, the end of life bit EOL and a loading permission signal LDP indicating an operation state of the semiconductor device 10. The loading permission signal LDP may be provided from an external device or may be generated inside the key protection control logic 300 based on information provided from the external device.

The OTP memory device 100 may read the secret value SCV to transfer the secret value SCV to the key register 200, only when the read enable signal REN is activated. Exemplary embodiments of the key protection control logic 300 will be described below with reference to FIGS. 4 through 12.

The processor 20 may control various elements of the semiconductor device 10 and may execute a variety of types of software. For example, the processor 20 may run security software for executing only tasks authenticated according to a predetermined criterion, and may run non-security software for executing tasks that do not need to be authenticated. For example, the processor 20 may execute a binary, such as a boot image authenticated during the booting of the semiconductor device 10. The processor 20 may include, but is not limited to, a plurality of central processing unit (CPU) cores.

The OTP memory device 100 may store the secret value SCV to be used by the processor 20 to execute security software. In some exemplary embodiments, the secret value SCV may be permanently programmed into the OTP memory device 100 with a predetermined value during a process of fabricating the semiconductor device 10.

The key protection control logic 300 may determine, based on the key protection bit PRT and the end of life bit EOL, whether to load the secret value SCV from the OTP memory device 100 to the key register 200. The software executed by the processor 20 may not access the OTP memory device 100 and may access the key register 200.

The secret value SCV, the key protection bit PRT and the end of life bit EOL, which are stored in the OTP memory device 100, may be inaccessible by software and may be accessible only by the key protection control logic 300 that is implemented as hardware. The OTP driver 120 in the OTP memory device 100 may perform loading of the secret value SCV from the OTP memory device 100 to the key register 200 according to the decision of the key protection control logic 300, for example, according to the read enable signal REN. In some exemplary embodiments, the OTP driver 120 may be controlled only by the security software executed by the processor 20.

The key register 200 is a hardware interface that may provide the loaded secret value SCV to the security software. For example, the security software may read the secret value SCV loaded into the key register 200. In addition, the key register 200 may be inaccessible through the debugging port 90.

In some exemplary embodiments, the key protection control logic 100 may perform one or more logic operations on the key protection bit PRT and the end of life bit EOL stored in the key register 200, and may determine whether to load the secret value SCV from the OTP memory device 100 into the key register 200 based on the results of the one or more logic operations.

The ROM 70 may store binaries to be executed upon booting of the semiconductor device 10, and the processor 20 may perform a booting sequence based on the binaries stored in the ROM 70. The booting sequence may be performed during the power-on process and the reset process of the semiconductor device 10. Based on progress of the booting sequence, the processor 20 may generate a read locking signal RLK as will be described below with reference to FIGS. 10 through 12. The read locking signal RLK may be deactivated between a start time point of the booting sequence of the semiconductor device 10 and an end time point of the booting sequence.

The debugging port 90 may provide a debugging interface to a user, and an external debugging device (or debugger) may be connected to the debugging port 90. For example, the debugging port may be a joint test action group (JTAG) port.

The debugging port protection logic 80 may monitor the debugging port 90 to determine whether the debugging device is connected to the debugging port 90. The debugging port protection logic 80 may generate a debugger attach signal DBG as will be described below with reference to FIGS. 10 through 12. The debugger attach signal DBG may indicate whether the debugging device is connected to the debugging port 90.

The security circuit 30 may perform security functions such as authentication and encryption, under control of the security software executed by the processor 20. For example, the security circuit 30 may perform encryption and/or decryption of the data stored in the nonvolatile memory device 50 and/or the volatile memory device 60, based on a secret key. The secret key may be the secret value SCV itself or the secret key may be generated based on the secret value SCV.

The input-output device 40 may include input devices such as a mouse, a keyboard and a touchscreen, and output devices such as a monitor and a speaker. In addition, the input-output device 40 may include an interface circuit to communicate with external devices such as a host device. Through the input-output device 40, information on the life cycle of the semiconductor device 10 may be provided to the security software of the processor 20, and the security software may program, based on the information on the life cycle, the key protection bit PRT and the end of life bit EOL from an initialized first value to a second value.

Figure 3:
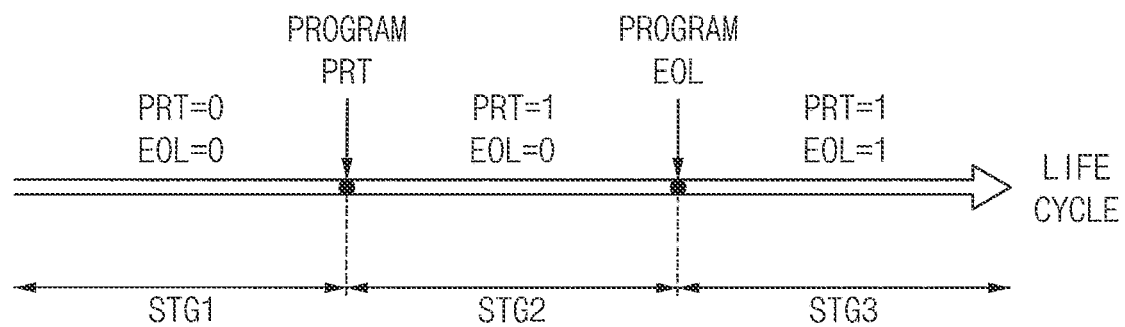
FIG. 3 is a diagram illustrating a key protection value and an end of life value according to a life cycle of a semiconductor device according to exemplary embodiments.

FIG. 3 is a diagram illustrating a key protection value and an end of life value according to a life cycle of a semiconductor device according to exemplary embodiments.

Referring to FIGS. 1 and 3, the life cycle of the semiconductor device 10 may include a development stage STG1 to design, manufacture and test the semiconductor device 10, a usage stage STG2 to use the semiconductor device 10 after the development of the semiconductor device 10 is completed, and an end of life stage STG3 to discard the semiconductor device 10. The information on the life cycle of the semiconductor device 10 may be provided through the input-output device 40 from an external host device. In some exemplary embodiments, the security software executed by the processor 20 may determine entrance of the end of life stage STG3 when a particular condition is satisfied.

During the development stage STG1, the key protection bit PRT and the end of life bit EOL may have a first value that is initialized. At a time point when the development stage STG1, the security software may program the key protection bit PRT to a second value from the initialized first value. Accordingly, during the usage stage STG2, the key protection bit PRT has the second value that is programmed and the end of life bit EOL maintains the first value that is initialized.

FIG. 3 illustrates a non-limiting example in which the initialized first value corresponds to "0" and the programmed second value corresponds to "1". According to configurations of the memory cells in the OTP memory device 100, the first value may be "1" and the second value may be "0". Hereinafter, exemplary embodiments are described based on the first value of "0" and the second value of "1". The value of "0" may correspond to a logic low level L of a signal and the value of "1" may correspond to a logic high level H of the signal.

At a time point when the usage stage STG2 is completed, that is, when the discard of the semiconductor device 10 is determined, the security software may program the end of life bit EOL to the second value from the initialized first value. Accordingly, during the end of life stage STG3, the key protection bit PRT and the end of life bit EOL may have the second value.

As such, the key protection bit PRT and the end of life bit EOL may be sequentially programmed according to the life cycle of the semiconductor device 10. As will be described below, different security policies may be applied to the development stage STG1, the usage stage STG2 and the end of life stage STG3, through the sequential programming.

Figure 4:
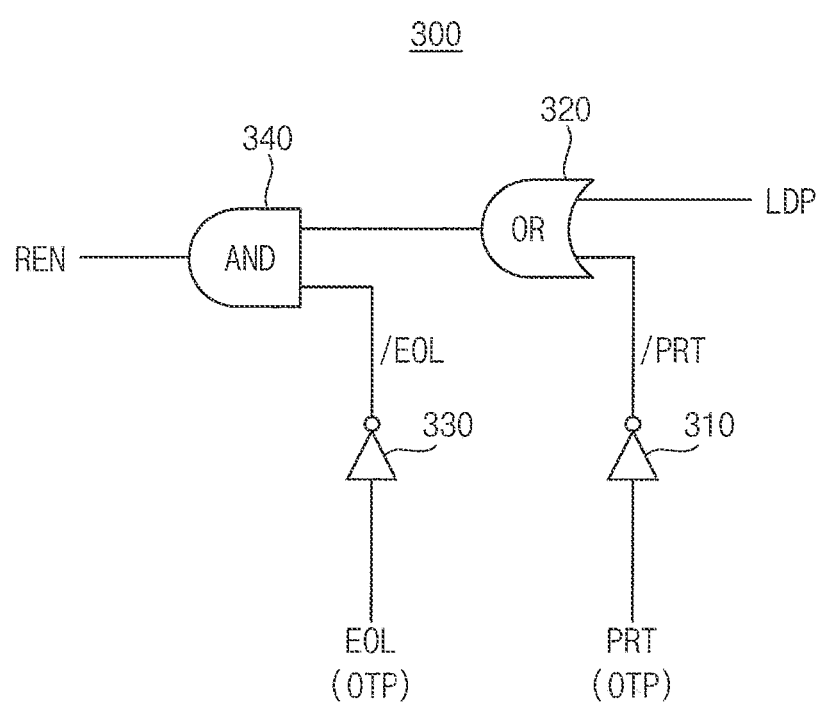
FIG. 4 is a diagram illustrating an exemplary embodiment of a key protection control logic included in a semiconductor device according to such exemplary embodiments.

FIG. 4 is a diagram illustrating an exemplary embodiment of a key protection control logic included in a semiconductor device according to such exemplary embodiments.

Referring to FIGS. 1 and 4, the key protection control logic 300 may include a first inverter 310, an OR gate 320, a second inverter 330 and an AND gate 340.

The first inverter 310 may invert the key protection bit PRT to generate an inverted key protection signal/PRT. The OR gate 320 may perform an OR logic operation on the loading permission signal LDP and the inverted key protection signal/PRT. The second inverter 330 may invert the end of life bit EOL to generate an inverted end of life signal/EOL. The AND gate 340 may perform an AND logic operation on an output signal of the OR gate 320 and the inverted end of life signal/EOL to generate the read enable signal REN.

As such, the key protection control logic 300 may generate the read enable signal REN based on the key protection bit PRT, the end of life bit EOL and the loading permission signal LDP indicating the operation state of the semiconductor device 10. The OTP memory device 100 may read the secret value SCV to transfer the secret value SCV to the key register 200, only when the read enable signal REN is activated.

FIG. 5 is a diagram illustrating an operation of the key protection control logic of FIG. 4.

Referring to FIG. 5, during the development stage STG1 of the semiconductor device 10, the key protection bit PRT and the end of life bit EOL may have the first value of "0". In this case, the read enable signal REN may be activated to the logic high level H regardless of the logic level of the loading permission signal LDP. Accordingly, during the development stage STG1, the loading of the secret value SCV from the OTP memory device 100 to the key register 200 may be permitted regardless of the loading permission signal LDP, that is, regardless of the operation state of the semiconductor device 10.

During the usage stage STG2, the key protection bit PRT may have the programmed second value of "1" and the end of life bit EOL may have the initialized first value of "0". In this case, the read enable signal REN may be activated to the logic high level H or may be deactivated to the logic low level L, depending on the logic level of the loading permission signal LDP. Accordingly, during the usage stage STG2, the loading of the secret value SCV from the OTP memory device 100 to the key register 200 may be permitted or blocked according to the operation state of the semiconductor device 10.

During the end of life stage STG3, the end of life bit EOL may have the programmed second value of "1". The key protection bit PRT may have the programmed second value of "1" when the semiconductor device 10 experienced the usage stage STG2, or the key protection bit PRT may have the initialized first value of "0" when the semiconductor device 10 needs to be discarded when the semiconductor device 10 enters the end of life stage STG3 directly from the development stage STG1 not via the usage stage STG2. The read enable signal REN may be deactivated to the logic low level L regardless of the value of the key protection bit PRT and the logic level of the loading permission signal LDP. Accordingly, the loading of the secret value SCV from the OTP memory device 100 to the key register 200 may be blocked regardless of the operation state of the semiconductor device 10.

As a result, the loading of the secret value SCV may be permitted always for the test of the semiconductor device 10 during the development state STG1, and may be blocked always during the end of life stage STG3. The loading permission signal LDP may be activated to permit the loading of the secret value SCV if there is no problem in the security of the semiconductor device as the result of monitoring the operational state of the semiconductor device 10.

As such, the semiconductor device and the method of operating the semiconductor device according to exemplary embodiments may enhance the security of the secret value and simultaneously optimize utilization of the secret value, using the key protection bit and the end of life bit that are stored in the OTP memory device. Furthermore, various security policies may be applicable and the secret value may be protected at the hardware level against undesirable exposure after the semiconductor device is discarded.

FIGS. 6 through 9 are diagrams illustrating an operation according to a life cycle of a semiconductor device according to exemplary embodiments.

Referring to FIGS. 6 through 9, the key protection control logic 300 may include a first inverter 310, an OR gate 320, a second inverter 330 and an AND gate 340 as described with reference to FIG. 4. The first inverter 310 may invert the key protection bit PRT to generate an inverted key protection signal/PRT. The OR gate 320 may perform an OR logic operation on the loading permission signal LDP and the inverted key protection signal/PRT. The second inverter 330 may invert the end of life bit EOL to generate an inverted end of life signal/EOL. The AND gate 340 may perform an AND logic operation on an output signal of the OR gate 320 and the inverted end of life signal/EOL to generate the read enable signal REN.

The key protection control logic 300 may generate the read enable signal REN based on the key protection bit PRT, the end of life bit EOL and the loading permission signal LDP indicating the operation state of the semiconductor device 10. The OTP memory device 100 may read the secret value SCV to transfer the secret value SCV to the key register 200, only when the read enable signal REN is activated.

Figure 6:
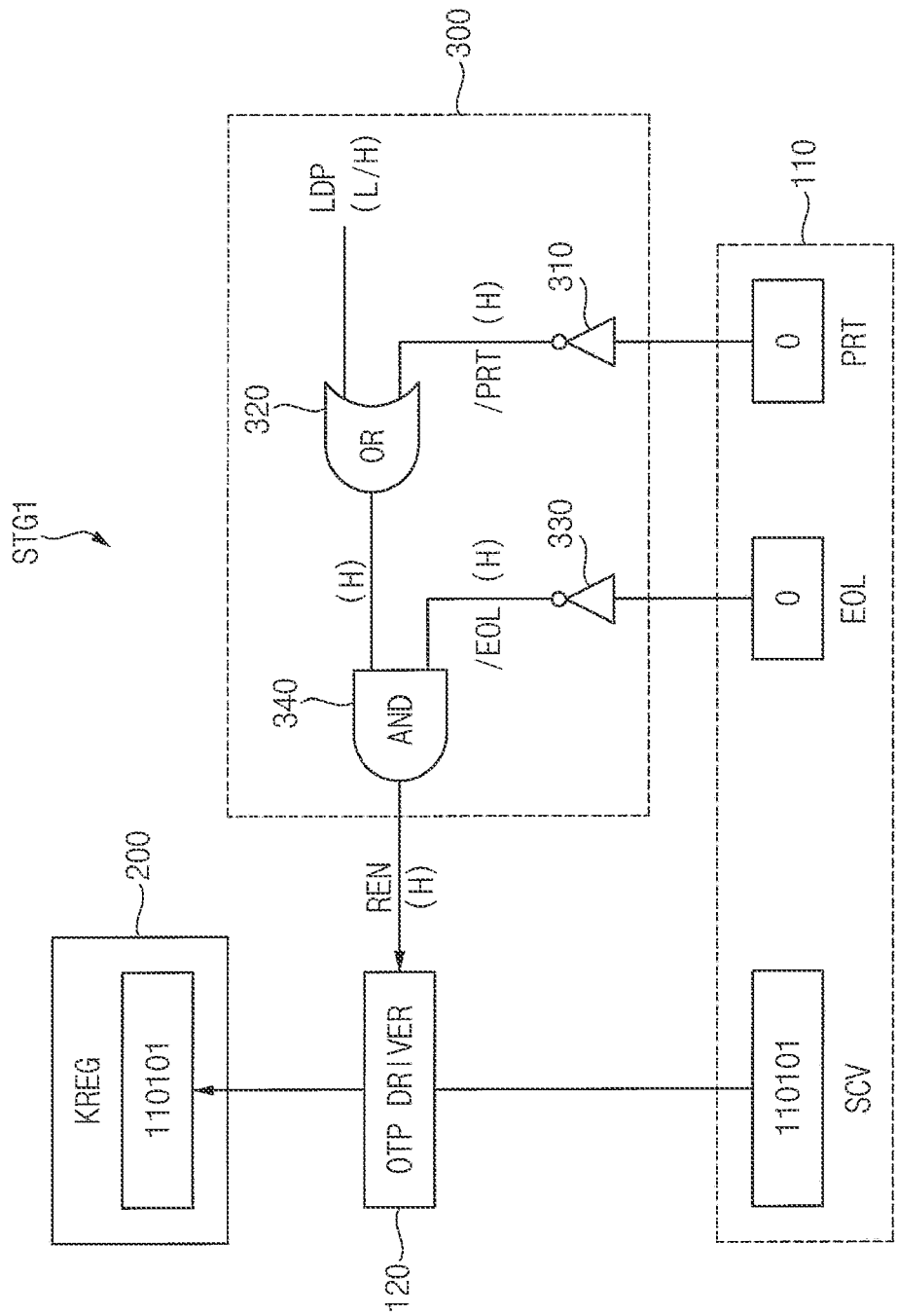
FIGS. 6 through 9 are diagrams illustrating an operation according to a life cycle of a semiconductor device according to exemplary embodiments.

FIG. 6 illustrates the loading operation of the secret value SCV during the development stage STG1. As illustrated in FIG. 6, during the development stage STG1, the inverted end of life signal/EOL and the output signal of the OR gate 320, which are input to the AND gate 340, may be activated to the logic high level H regardless of the logic level of the loading permission signal LDP. Accordingly, the read enable signal REN may be always activated to the logic high level H, and the OTP driver 120 may read the secret value SCV (e.g., "110101") stored in the OTP memory device 100 and load the secret value SCV to the key register 200, in response to activation of the read enable signal REN.

Figure 7:
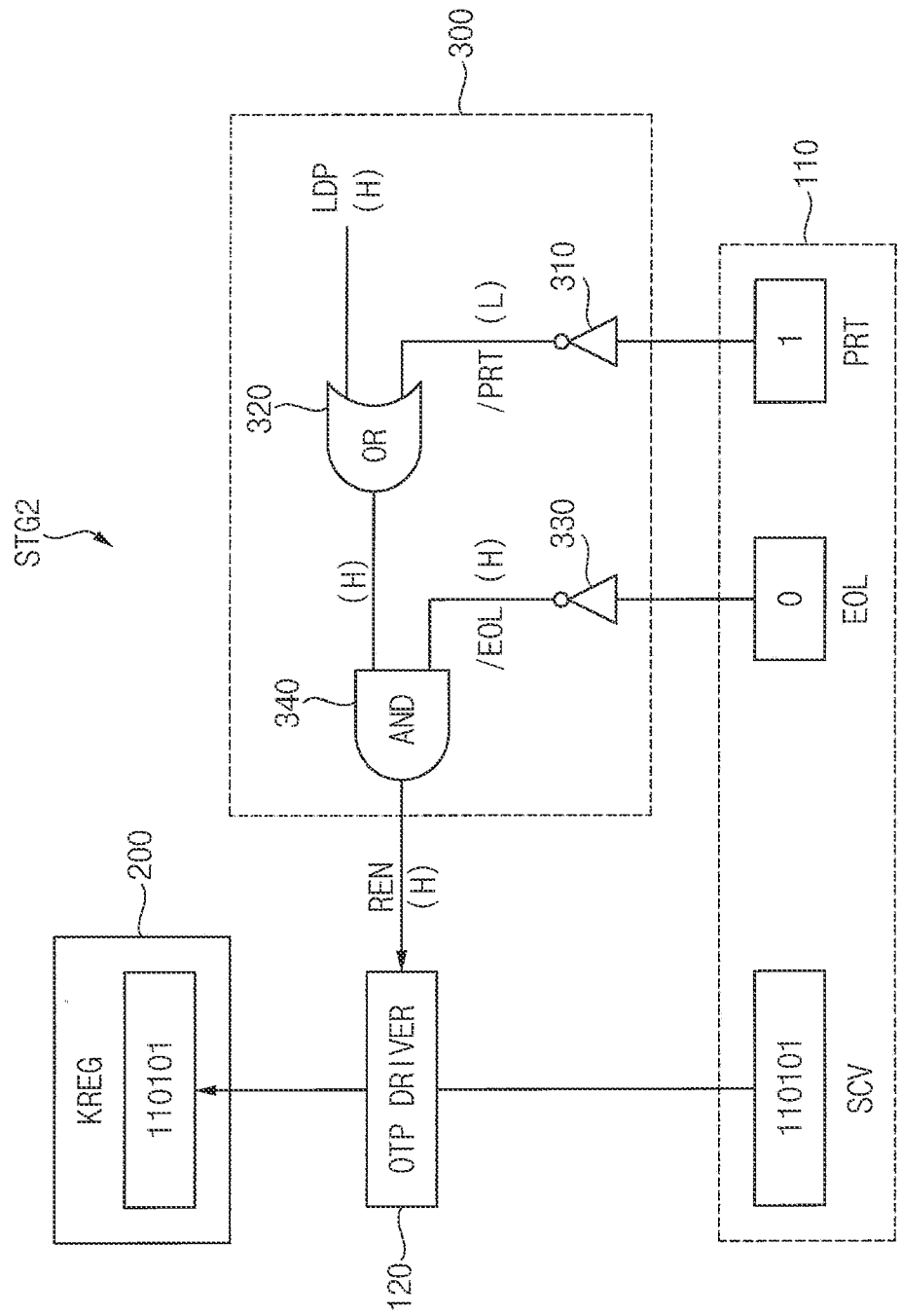
Figure 8:
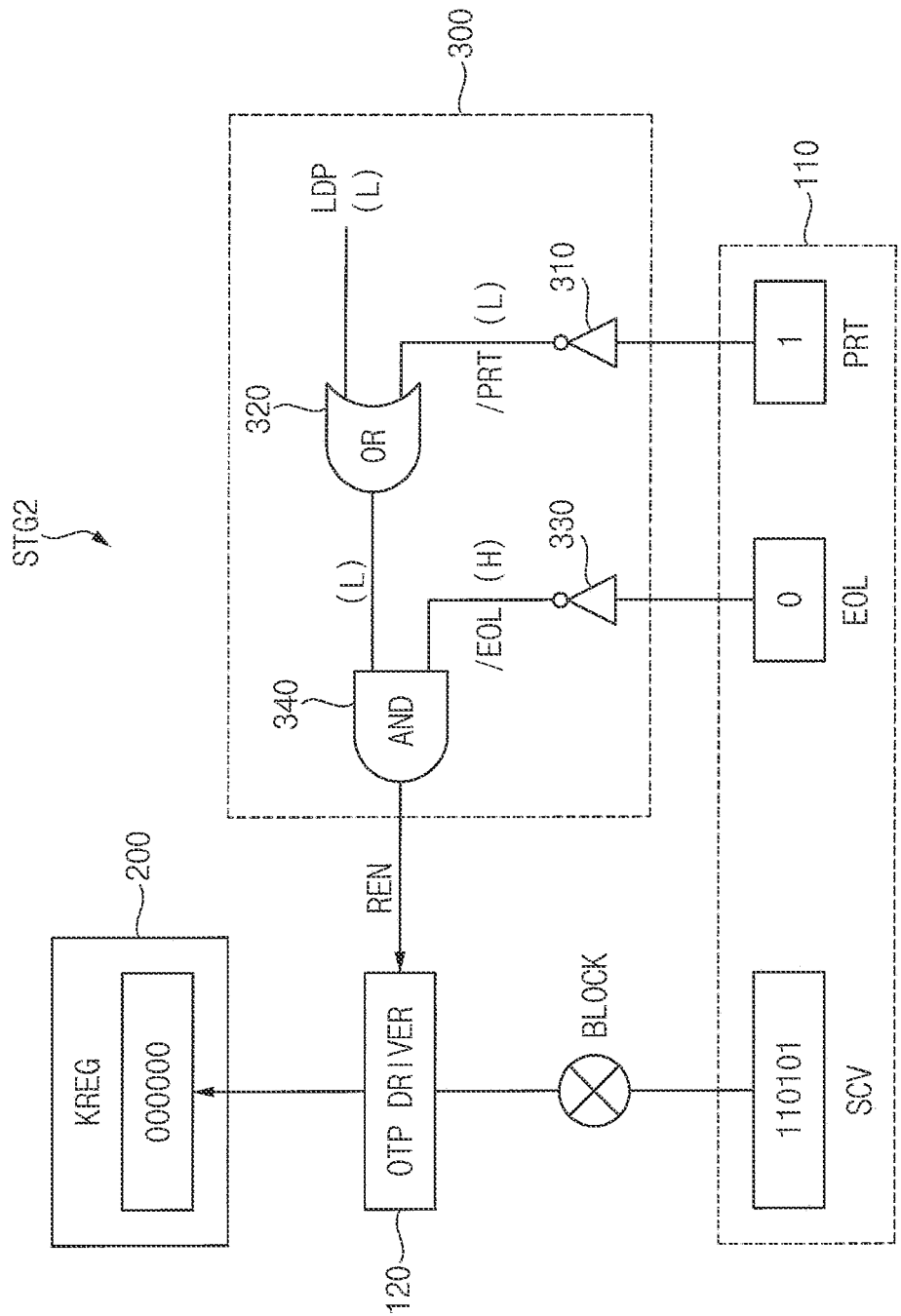

FIGS. 7 and 8 illustrate the loading operation of the secret value SCV during the usage stage STG2. During the usage stage STG2, the inverted end of life signal/EOL may be activated to the logic high level H, and the output signal of the OR gate 320 may be selectively activated to the logic high level H depending on the logic level of the loading permission signal LDP. As illustrated in FIG. 7, when the loading permission signal LDP is activated to the logic high level H, the read enable signal REN may be activated to the logic high level H and the OTP driver 120 may load the secret value SCV from the OTP memory device 100 to the key register 200. In contrast, as illustrated in FIG. 8, when the loading permission signal LDP is deactivated to the logic low level L, the read enable signal REN may be deactivated to the logic low level L and the OTP driver 120 may block the loading of the secret value SCV from the OTP memory device 100 to the key register 200. In this case, the key register 200 may maintain the initialized value (e.g., "000000").

Figure 9:
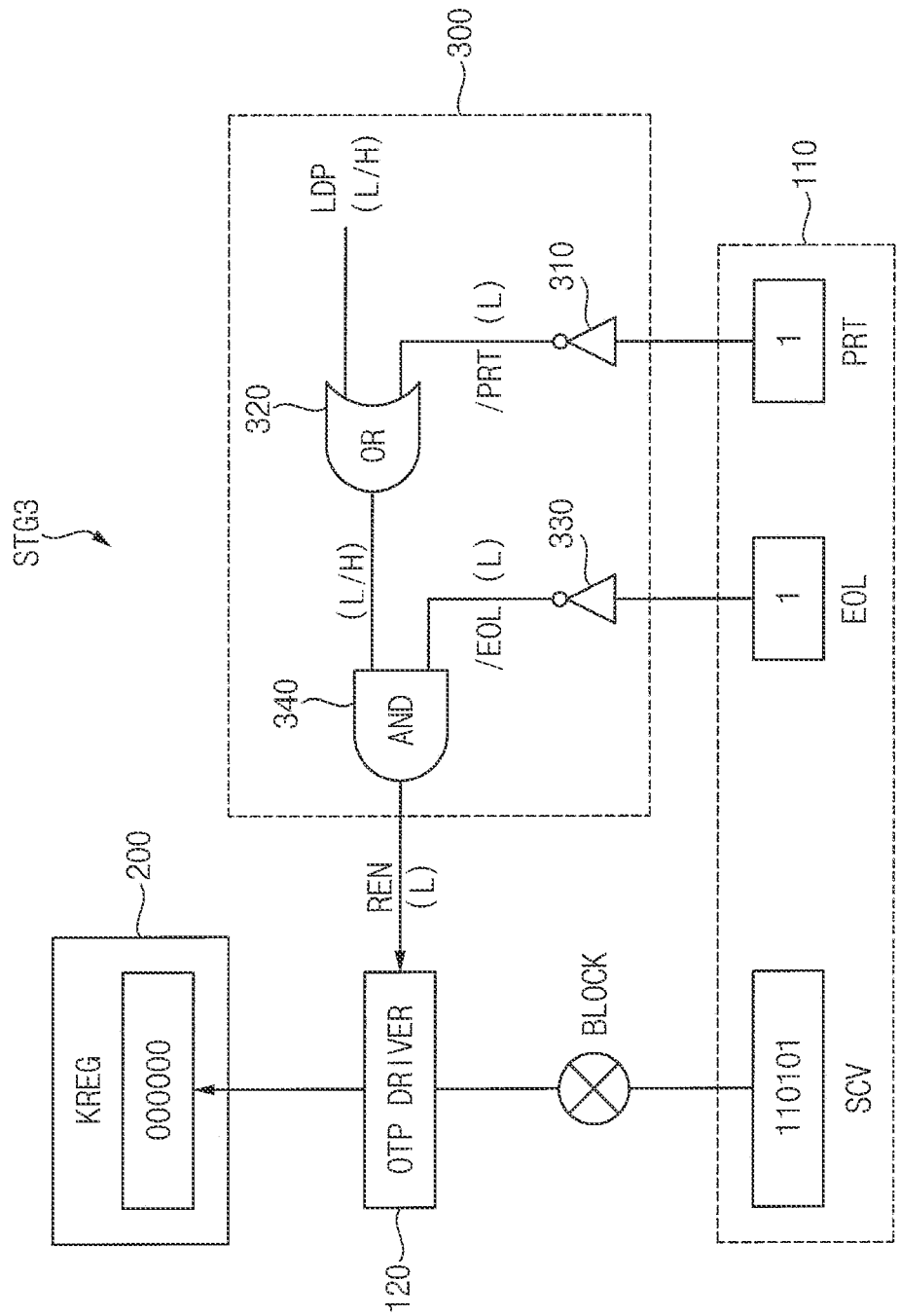

FIG. 9 illustrates the loading operation of the secret value SCV during the end of life stage STG3. As illustrated in FIG. 9, during the end of life stage STG3, the inverted end of life signal/EOL, which corresponds to one input of the AND gate 340, may be deactivated to the logic low level L regardless of the logic level of the loading permission signal LDP. Accordingly, the read enable signal REN may be always deactivated to the logic low level L, and the OTP driver 120 may block the loading of the secret value SCV from the OTP memory device 100 to the key register 200 in response to deactivation of the read enable signal REN.

Figure 10:
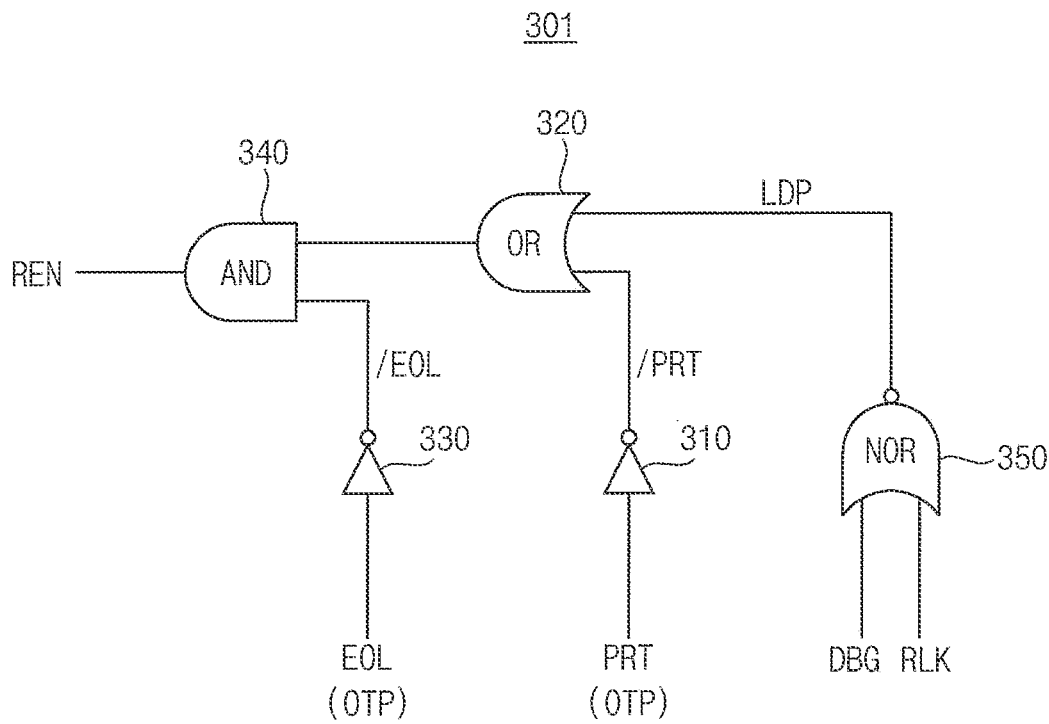
FIG. 10 is a diagram illustrating an exemplary embodiment of a key protection control logic included in a semiconductor device according to such exemplary embodiments.
Figure 11:
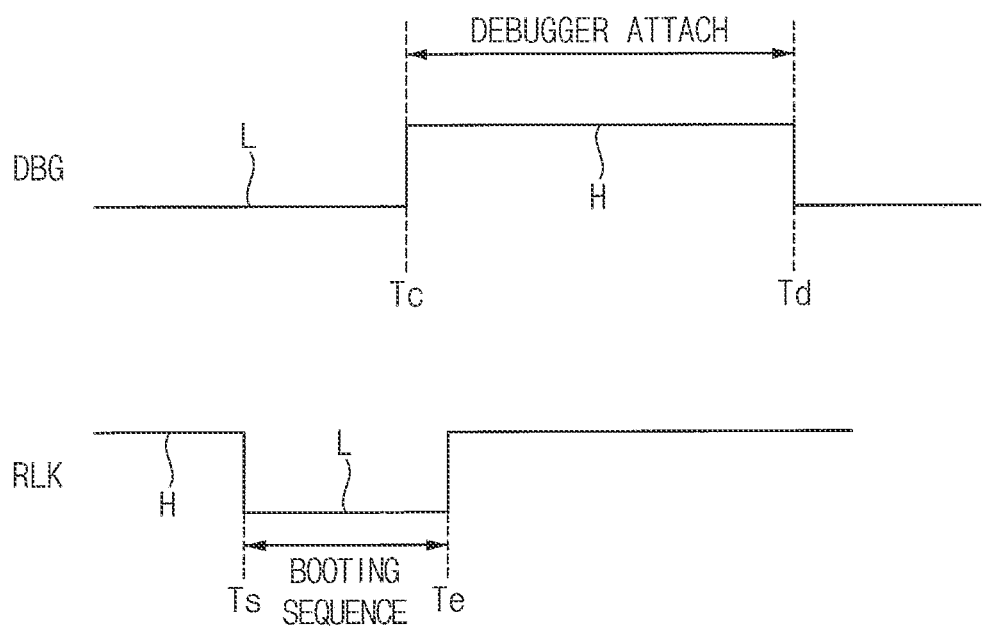
FIG. 11 is a diagram illustrating an exemplary embodiment of signals provided to the key protection control logic of FIG. 10, which indicates an operation state of a semiconductor device.

FIG. 10 is a diagram illustrating an exemplary embodiment of a key protection control logic included in a semiconductor device according to exemplary embodiments, and FIG. 11 is a diagram illustrating an exemplary embodiment of signals provided to the key protection control logic of FIG. 10, which indicates an operation state of a semiconductor device.

Referring to FIG. 10, a key protection control logic 301 may include a first inverter 310, an OR gate 320, a second inverter 330, an AND gate 340 and a NOR gate 350.

The NOR gate 350 may perform an NOR logic operation on a debugger attach signal DBG a read locking signal RLK to generate the loading permission signal LDP.

Referring to FIG. 11, the debugger attach signal DB G may be activated to the logic high level H during time interval Tc~Td when a debugging device is connected to a debugging port of the semiconductor device. As described above, the debugger attach signal DBG may be generated by the debugging port protection logic 80 in FIG. 1.

The read locking signal RLK may be deactivated between a start time point Ts of a booting sequence of the semiconductor device and an end time point Te of the booting sequence. As described above, the read locking signal RLK may be generated by the processor 20 in FIG. 1.

As a result, during the usage stage STG2, the loading of the secret value SCV may be permitted during the booting sequence when the debugging device is not connected to the debugging port 90.

The exemplary embodiments are described based on the two signals indicating the operation state of the semiconductor device, that is, the debugger attach signal DBG and the read locking signal RLK, but exemplary embodiments are not limited thereto. The numbers and the kinds of the signals indicating the operation state of the semiconductor device to determining whether to activate the loading permission signal LDP may be determined variously.

Referring again to FIG. 10, the first inverter 310 may invert the key protection bit PRT to generate an inverted key protection signal/PRT. The OR gate 320 may perform an OR logic operation on the loading permission signal LDP and the inverted key protection signal/PRT. The second inverter 330 may invert the end of life bit EOL to generate an inverted end of life signal/EOL. The AND gate 340 may perform an AND logic operation on an output signal of the OR gate 320 and the inverted end of life signal/EOL to generate the read enable signal REN.

As such, the key protection control logic 300 may generate the read enable signal REN based on the key protection bit PRT, the end of life bit EOL and the loading permission signal LDP indicating the operation state of the semiconductor device 10. The OTP memory device 100 may read the secret value SCV to transfer the secret value SCV to the key register 200, only when the read enable signal REN is activated.

FIG. 12 is a diagram illustrating an operation of the key protection control logic of FIG. 10.

Referring to FIG. 12, during the development stage STG1 of the semiconductor device 10, the key protection bit PRT and the end of life bit EOL may have the first value of "0". In this case, the read enable signal REN may be activated to the logic high level H regardless of the logic level of the loading permission signal LDP. Accordingly, during the development stage STG1, the loading of the secret value SCV from the OTP memory device 100 to the key register 200 may be permitted regardless of the loading permission signal LDP, that is, regardless of the operation state of the semiconductor device 10.

During the usage stage STG2, the key protection bit PRT may have the programmed second value of "1" and the end of life bit EOL may have the initialized first value of "0". In this case, the read enable signal REN may be activated to the logic high level H or may be deactivated to the logic low level L, depending on the logic level of the loading permission signal LDP. As illustrated in FIG. 12, the loading permission signal LDP may be activated to the logic high level H when both of the debugger attach signal DBG and the read locking signal RLK are deactivated to the logic low level L. Otherwise, the loading permission signal LDP may be deactivated to the logic low level L. Accordingly, during the usage stage STG2, the loading of the secret value SCV from the OTP memory device 100 to the key register 200 may be permitted or blocked according to the operational state of the semiconductor device 10.

During the end of life stage STG3, the end of life bit EOL may have the programmed second value of "1". The key protection bit PRT may have the programmed second value of "1" when the semiconductor device 10 experienced the usage stage STG2, or the key protection bit PRT may have the initialized first value of "0" when the semiconductor device 10 needs to be discarded when the semiconductor device 10 enters the end of life stage STG3 directly from the development stage STG1 not via the usage stage STG2. The read enable signal REN may be deactivated to the logic low level L regardless of the value of the key protection bit PRT and the logic level of the loading permission signal LDP. Accordingly, the loading of the secret value SCV from the OTP memory device 100 to the key register 200 may be blocked regardless of the operational state of the semiconductor device 10.

As a result, the loading of the secret value SCV may be permitted always for the test of the semiconductor device 10 during the development state STG1, and may be blocked always during the end of life stage STG3. The loading permission signal LDP may be activated to permit the loading of the secret value SCV if there is no problem in security of the semiconductor device as the result of monitoring the operational state of the semiconductor device 10.

As such, the semiconductor device and the method of operating the semiconductor device according to exemplary embodiments may enhance the security of the secret value and simultaneously optimize utilization of the secret value, using the key protection bit and the end of life bit that are stored in the OTP memory device. Furthermore, various security policies may be applicable and the secret value may be protected at the hardware level against undesirable exposure after the semiconductor device is discarded.

Among memory devices for storing data, non-volatile memory devices may retain the stored data even if power to the memory device is off. For example, non-volatile memory devices may include read only memory (ROM), a magnetic memory, optical memory, flash memory, etc. Non-volatile memory devices within which, once the data are written or programmed, the data cannot be altered may be referred to as a one-time programmable (OTP) memory. After the data are programmed in the OTP memory cell, the structure of the OTP memory cell is changed irreversibly and the data, '0' or '1,' may be stored in the OTP memory cell. The OTP memory device may be used variously as an embedded non-volatile storage for storing information on repair of other devices, analog trimming, security codes, for example. Hereinafter, the OTP memory device is described with reference to FIGS. 13 through 17.

Figure 13:
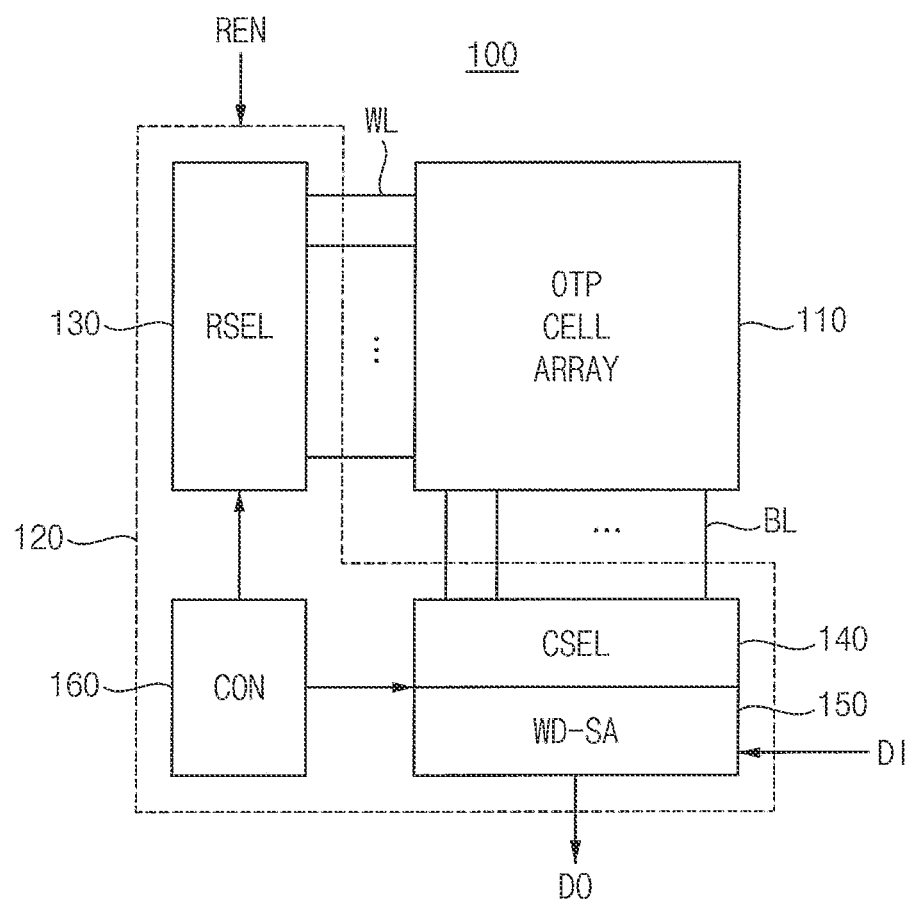
FIG. 13 is a block diagram illustrating an exemplary embodiment of an OTP memory device included in a semiconductor device according to such exemplary embodiments.

FIG. 13 is a block diagram illustrating an exemplary embodiment of an OTP memory device included in a semiconductor device according to such exemplary embodiments.

Referring to FIG. 13, an OTP memory device 100 may include an OTP cell array 110, and an OTP driver 120. The OTP driver 120 may include a row selection circuit RSEL 130, a column selection circuit CSEL 140, a read-write circuit WD-SA 150 and a controller CON 160.

The OTP cell array 110 may include a plurality of OTP memory cells that are coupled to a plurality of bit lines BL and a plurality of word lines WL, respectively. As will be described below with reference to FIG. 14, each word line WL may include a voltage word line WLP and a read word line WLR.

The row selection circuits 130 may include a row decoder for selecting a word line WL corresponding to a row address and a voltage driver for providing various voltages applied to the word lines WL. The column selection circuit 140 may include a column gate circuit and a column decoder for selecting a bit line corresponding to a column address. The column decoder may generate column selection signals based on the column address and a column selection enable signal. The column gate circuit may include a plurality of switches that are turned on selectively in response to the column selection signals. The switch corresponding to the column address may be turned on to select the bit line BL.

The read-write circuit 150 may be connected to the bit lines BL via the column selection circuit 140. The read-write circuit 16 may include a read sense amplifier SA and a write driver WD. The read sense amplifier SA may perform a read operation for sensing the data stored in the OTP memory cells and providing the read data. The write driver WD may perform a write operation for storing the write data into the OTP memory cells. The write driver WD and the read sense amplifier SA may be formed inseparably or separably.

The controller 160 may provide control signals, including a row address signal, a column address signal, etc., to control overall operations of the OTP memory device 100. In an exemplary embodiment, the controller 160 may be implemented as a logic circuit dedicated to the OTP memory device 100. In another exemplary embodiment, at least a portion of the controller 160 may be included in the other processor in the semiconductor device.

The OTP driver 12— may be enabled in response to activation of the above-described read enable signal REN. The secret value SCV, the key protection bit PRT and the end of life bit EOL may be stored at predetermined addresses of the OPT cell array 110. The OTP cell array 110 may store other information to control the semiconductor device in addition to the secret value SCV, the key protection bit PRT and the end of life bit EOL.

Figure 14:
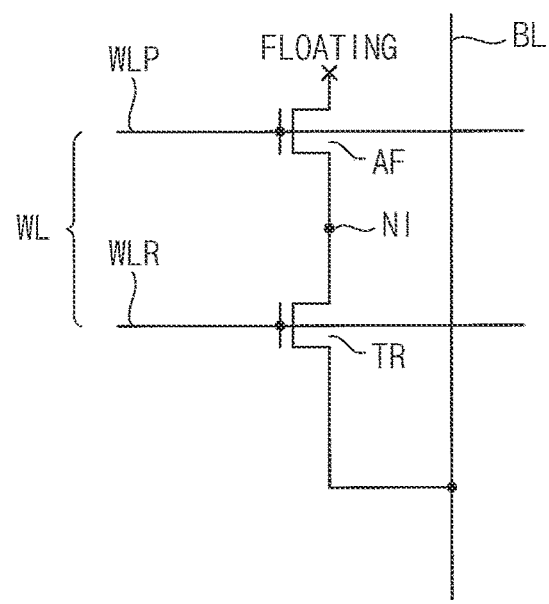
FIG. 14 is a circuit diagram illustrating an example of an OTP cell included in the OTP memory device of FIG. 13.

FIG. 14 is a circuit diagram illustrating an example of an OTP cell included in the OTP memory device of FIG. 13.

Referring to FIG. 14, an OTP memory cell UCa may include an antifuse AF and a read transistor TR.

The antifuse AF may be connected between a corresponding voltage word line WLP and an intermediate node NI. The read transistor TR may be connected between the intermediate node NI and a corresponding bit line BL.

The antifuse AF may be implemented with a metal oxide semiconductor (MOS) transistor. In an exemplary embodiment, as illustrated in FIG. 14, a drain electrode of the MOS transistor AF may be floated, a source electrode of the MOS transistor AF may be connected to the intermediate node NI and a gate electrode of the MOS transistor AF may be connected to the voltage word line WLP.

The antifuse AF, which is an exemplary element of the OTP memory cell, may have an electrical feature opposite to a typical fuse such that the antifuse AF has a higher resistance value in an unprogrammed state and a lower resistance value in a programmed state.

The antifuse AF may have a structure such that dielectric material is included between two conductors. The dielectric material may be broken and programmed by applying a high voltage between the two conductors for a sufficient time. As a result of the program, the two conductors are electrically connected through the broken dielectric material and thus the antifuse AF may have the lower resistance value. As one of the antifuse type OTP memory, the MOS capacitor having a thin gate oxide may be used as the antifuse AF and the high voltage may be applied between the two electrodes of the MOS capacitor to program the MOS capacitor. An OTP memory cell using a MOS capacitor may have a smaller cell area and a lower program current than in other embodiments and, as a result, low power and byte-wide programming may be achieved.

A program voltage VPGM of relatively a high voltage level may be applied to the voltage word line WLP in a program mode and read voltage VRD having a lower voltage level than the program voltage VPGM may be applied to the voltage word line WLP in a read mode. A selection voltage having a voltage level enough to turn on the read transistor TR may be applied to the read word line WLR in the program and read modes.

In the program mode, a program permission voltage VPER may be applied to the bit lines connected to the OTP memory cells to be programmed, and a program inhibition voltage VINH higher than the program permission voltage VPER may be applied to the bit lines connected to the OTP memory cells not to be programmed. For example, the program permission voltage VPER may be set to the ground voltage VSS, and/or the program inhibition voltage VINH and the read voltage VRD may be set to the power supply voltage. The voltage levels of the program voltage VPGM, the read voltage VRD, the program permission voltage VPER and the program inhibition voltage VINH may be set variously depending on the characteristics of the OTP memory cells and the configuration of the OTP memory device.

The program of the antifuse AF may be performed in the program mode such that the program voltage VPGM is applied to the voltage word line WLP, the selection voltage is applied to the read word line WLR to turn on the read transistor TR and the program permission voltage VPER is applied to the bit line BL, for example.

Figure 15:
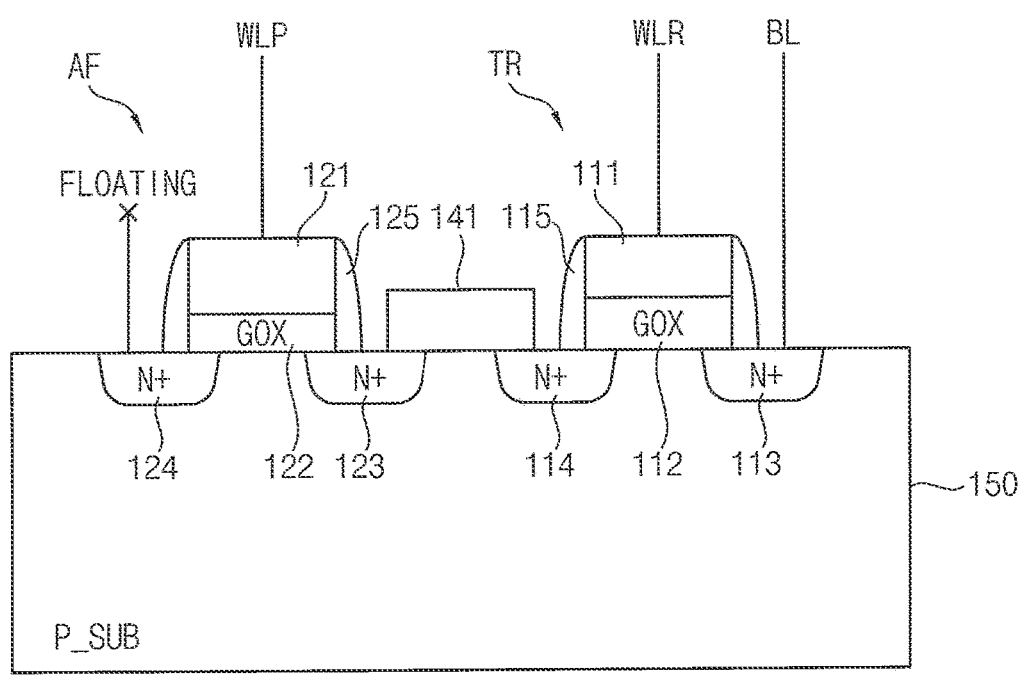
FIG. 15 is a cross-sectional diagram illustrating an exemplary structure of the OTP cell of FIG. 15.

FIG. 15 is a cross-sectional diagram illustrating an exemplary structure of the OTP cell of FIG. 15.

Referring to FIG. 15, a memory cell UCa may include an antifuse AF and a read transistor TR that are formed on a same substrate P-SUB 150.

The read transistor TR may include a first gate 111 connected to a corresponding read word line WLR, a first gate insulation layer GOX 112 insulating the first gate 111 from the substrate 150, a first source region 113 connected to a corresponding bit line BL and a first drain region 114.

The antifuse AF may include a second gate 121 connected to a corresponding voltage word line WLP, a second gate insulation layer 122 insulating the second gate 121 from the substrate 150, a second source region 123 connected to the first drain region 114 of the read transistor TR and a second drain region 124 that is floated.

The second source region 123 of the antifuse AF may be electrically connected to the first drain region 114 of the read transistor TR by a conduction path 141. The conduction path 141 may include metal lines formed in an upper space and interlayer structure such as vias for connecting the metal lines to the upper surface of the substrate 150. In some exemplary embodiments, the second source region 123 of the antifuse AF and the first drain region 114 of the read transistor TR may be combined and, in such cases, the conduction path 141 may be omitted.

For example, the substrate 150 may be doped with P-type impurities, and the source regions 113 and 123 and the drain regions 114 and 124 may be doped with N-type impurities.

The read transistor TR may further include a first spacer 115 formed on the sidewalls of the first gate 111 and the first gate insulation layer 112. The antifuse AF may further include a second spacer 125 formed on the sidewalls of the second gate 121 and the second gate insulation layer 122.

Hereinafter, processes for manufacturing the OTP memory cell UCa are described briefly.

The first gate insulation layer 112, the second gate insulation layer 122 and the third insulation layer 132 may be formed on the substrate 150. The first gate 111 may be formed on the first gate insulation layer 112 and the second gate 121 may be formed on the second gate insulation layer 122. The source regions 113 and 123 and the drain regions 114 and 124 may be formed by an ion implantation process, which implants N-type impurities into both sides of the first gate 111 and the second gate 121. After that, the spacers 115 and 125 and the conduction path 141 may be formed.

Figure 16:
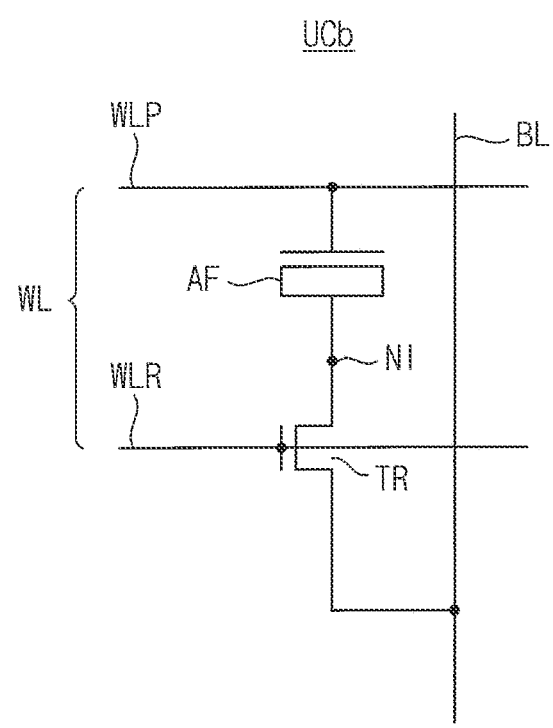
FIG. 16 is a circuit diagram illustrating another example of an OTP cell included in the OTP memory device of FIG. 13.

FIG. 16 is a circuit diagram illustrating another example of an OTP cell included in the OTP memory device of FIG. 13.

Referring to FIG. 16, an OTP memory cell UCb may include an antifuse AF and a read transistor TR.

The antifuse AF may be connected between a corresponding voltage word line WLP and an intermediate node NI. The read transistor TR may be connected between the intermediate node NI and a corresponding bit line BL, and a gate electrode of the read transistor TR may be connected to a corresponding read word line WLR.

The antifuse AF may be implemented with a metal oxide semiconductor (MOS) transistor. In an exemplary embodiment, as illustrated in FIG. 16, a drain electrode and a source electrode of the MOS transistor AF may be connected to the intermediate node NI and a gate electrode of the MOS transistor AF may be connected to the voltage word line WLP.

The structure and the manufacturing process of the OTP memory cell UCb of FIG. 16 may be similar to those of FIG. 15. To implement the MOS capacitor, a conduction path may be added to connect the second source region 123 and the second drain region 124 in FIG. 15.

Figure 17:
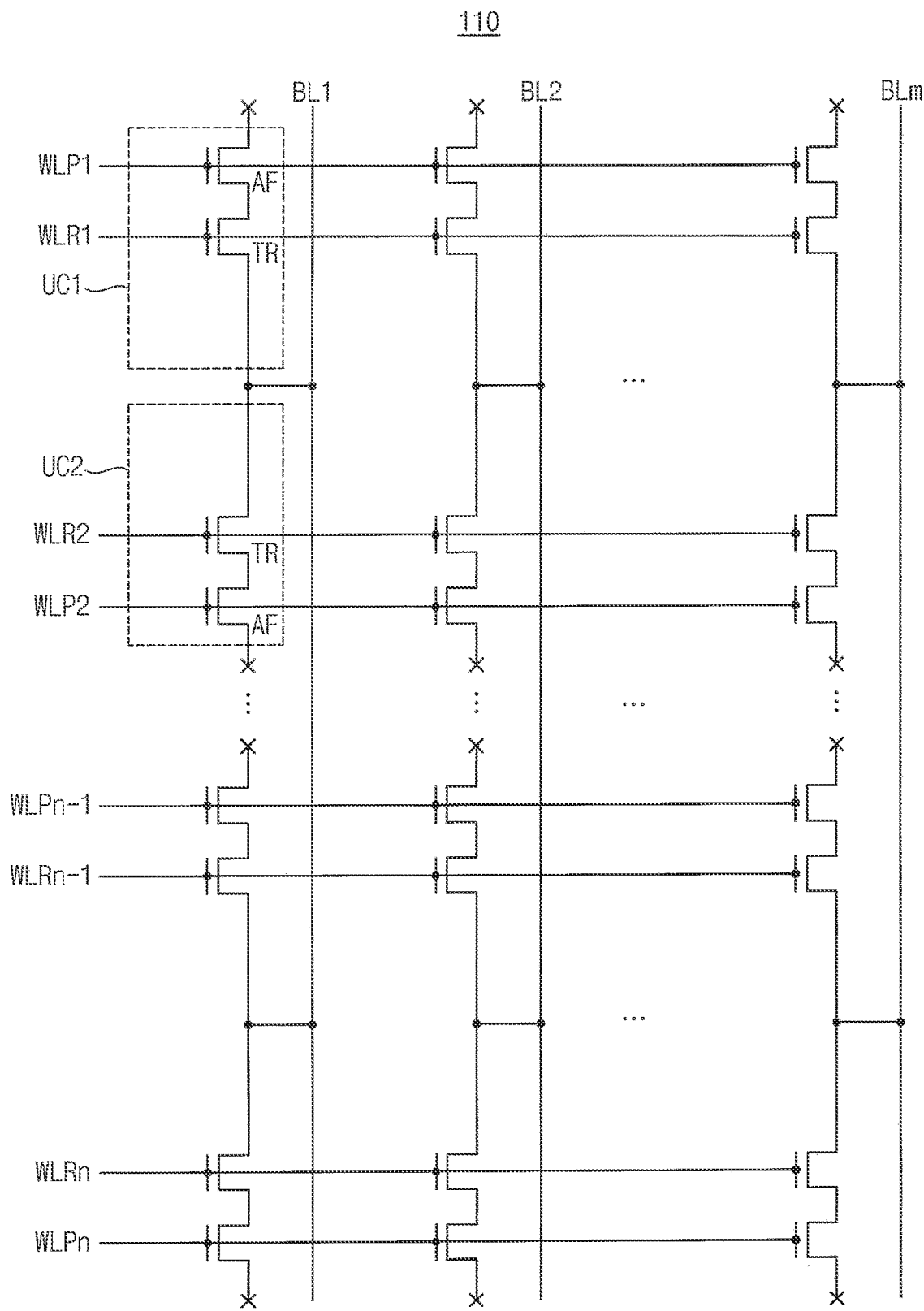
FIG. 17 is a circuit diagram illustrating an exemplary embodiment of a memory cell array included in the OTP memory device of FIG. 13.

FIG. 17 is a circuit diagram illustrating an exemplary embodiment of a memory cell array included in the OTP memory device of FIG. 13.

Referring to FIG. 17, an OTP cell array 110 may include a plurality of OTP memory cells UC1 and UC2 that are connected to a plurality of bit lines BL1~BLm, a plurality of voltage word lines WLP1~WLPn and a plurality of read word lines WLR1~WLRn, respectively, and arranged in an n*m matrix.

The gate electrode of the read transistor TR may be connected to the corresponding read word line WLRx (x=1~n) and the source electrode of the read transistor TR may be connected to the corresponding bit line BLy (y=1~m).

The first electrode of the antifuse AF may be connected to the corresponding word line WLPx and the second electrode of the antifuse AF may be connected to the drain electrode of the read transistor TR.

As described above, the antifuse AF may be a MOS transistor. The gate electrode or the first electrode of the MOS transistor AF may be connected to the corresponding voltage word line WLPx, the source electrode or the second electrode of the MOS transistor AF may be connected to the drain electrode of the read transistor TR and the drain electrode of the MOS transistor AF may be floated.

Each of the OTP memory cells UC1 and UC2 may include the antifuse AF, the read transistor TR and the cell switching transistor CTS. FIG. 17 illustrates a non-limiting example in which two unit cells UC1 and UC2 form a pair, however the arrangement of the unit cells may be implemented in other manners.

Hereinafter, a programming operation of the OTP memory cell according to exemplary embodiments is described with reference to FIGS. 13 through 17.

When programming a selected memory cell, which is connected to a selected voltage word line WLP1, a selected read word line WLR1 and a selected bit line BL1, a program voltage VPGM, which is a relatively high voltage, may be applied to the selected voltage word line WLP1 and a selection voltage, which is lower than the program voltage VPGM, may be applied to the selected read word line WLR1. A ground voltage 0V may be applied to non-selected voltage word lines WLP2, . . . , WLPn and non-selected read word lines WLR2, . . . , WLRn. The program permission voltage VPER (e.g., the ground voltage 0V) may be applied to the selected bit line BL1, and the program inhibition voltage VINH may be applied to non-selected bit lines BL2, . . . , BLm. For example, the program voltage VPGM may be about 7V, and the selection voltage may be about 3V.

The selection voltage may be applied to the first gate 111 of the read transistor TR through the selected read word line WLR1, and the ground voltage 0V may be applied to the source region 113 of the read transistor TR through the selected bit line BL1. Therefore, the read transistor TR may be turned on and a voltage of the first drain 114 may be 0V.

The program voltage VPGM may be applied to the second gate 121 of the antifuse AF through the selected voltage word line WLP1, and, as described above, the voltage of the second source region 123 of the antifuse AF, may be the ground voltage 0V. Therefore, an intensive electric field may be applied to the second gate insulation layer 122 of the antifuse AF1 to break down an insulating property of the second gate insulation layer 122 so that the selected memory cell is programmed.

The non-selected memory cells that are connected to the non-selected voltage word lines WLP2, . . . , WLPn and the non-selected read word lines WLR2, . . . , WLRn will not be programmed because the ground voltage 0V is applied to both the non-selected voltage word lines WLP2, . . . , WLPn and the non-selected read word lines WLR2 so that intensive electric field is not applied to the second gate insulation layer 122. The non-selected memory cells that are connected to the selected voltage word line WLP1, the selected read word line WLR1 and the non-selected bit lines BL2, . . . , BLm will not be programmed, either.

For example, an operation of the non-selected memory cell, which is connected to the selected voltage word line WLP1, the selected read word line WLR1 and the non-selected bit line BL2 may be described. The selection voltage may be applied to the selected read word line WLR1 and the program inhibition voltage VINH may be applied to the non-selected bit line BL2. A voltage difference between the first gate 111 of the read transistor TR and the first source region 113 of the read transistor TR may be zero so that the read transistor TR is turned off and the first drain region 114 of the read transistor TR is floated. Even though the program voltage VPGM is applied to the second gate 121 of the antifuse AF through the selected voltage word line WLP1, an intensive electric field will not be applied to the second gate insulation layer 122 of the antifuse AF because the second source region 123 of the antifuse AF is floated.

Figure 18:
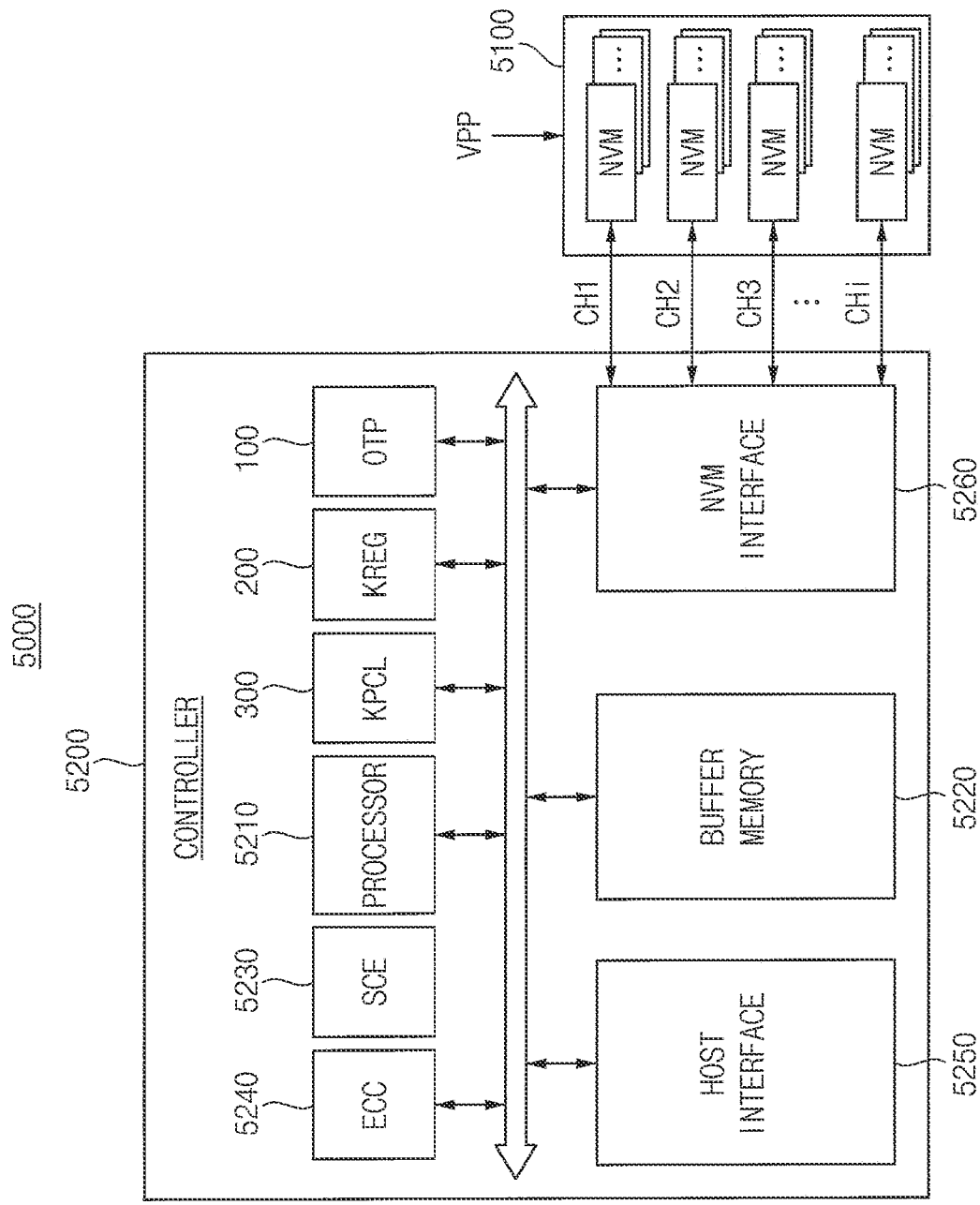
FIG. 18 is a block diagram illustrating a storage device according to exemplary embodiments.

FIG. 18 is a block diagram illustrating a storage device according to exemplary embodiments. In some exemplary embodiments, a storage device 5000 of FIG. 18 may be a solid state drive (SSD).

Referring to FIG. 18, the SSD 5000 may generally include nonvolatile memory devices 5100 and an SSD controller 5200.

The nonvolatile memory devices 5100 may (optionally) be configured to receive a high voltage VPP. One or more of the nonvolatile memory devices 5100 may be provided as memory device(s) according to the exemplary embodiments described above.

The SSD controller 5200 is connected to the nonvolatile memory devices 5100 via multiple channels CH1, CH2, CHI3, . . . Chi, in which i is a natural number. The SSD controller 1200 may include one or more processors 5210, a buffer memory 5220, a security circuit SCE 5230, an error correction code (ECC) circuit 5240, a host interface 5250, an nonvolatile memory interface 5260, an OTP memory device 100, a key register KREG 200 and a key protection control logic KPCL 300.

The buffer memory 5220 stores data used to drive the SSD controller 5200. The buffer memory 5220 includes multiple memory lines, each storing data or a command. The ECC circuit 5230 calculates error correction code values of data to be programmed at a writing operation, and corrects an error of read data using an error correction code value at a read operation. In a data recovery operation, The ECC circuit 5230 corrects an error of data recovered from the nonvolatile memory devices 5100.

As described above, the OTP memory device 100 may store a secret value SCV, a key protection bit PRT indicating whether to protect the secret value SCV, and an end of life bit EOL indicating whether to discard the SSD device 5000 corresponding to the above-described semiconductor device. As described below with reference to FIG. 3, the SSD device 5000 may sequentially program the key protection bit PRT and the end of life bit EOL depending on a life cycle of the SSD device 5000, under control of an external host device. The key register 200 may load the secret value SCV from the OTP memory device 100 and store the secret value SCV. The key protection control logic 300 may control loading of the secret value SCV from the OTP memory device 100 to the key register 200 based on the key protection bit PRT and the end of life bit EOL.

The security circuit 5230 may perform security functions such as authentication and encryption, under control of the security software executed by the processor 5210. For example, the security circuit 5230 may perform encryption and/or decryption of the data stored in the nonvolatile memory device 5100, based on a secret key. The secret key may be the secret value SCV itself or the secret key may be generated based on the secret value SCV.

Figure 19:
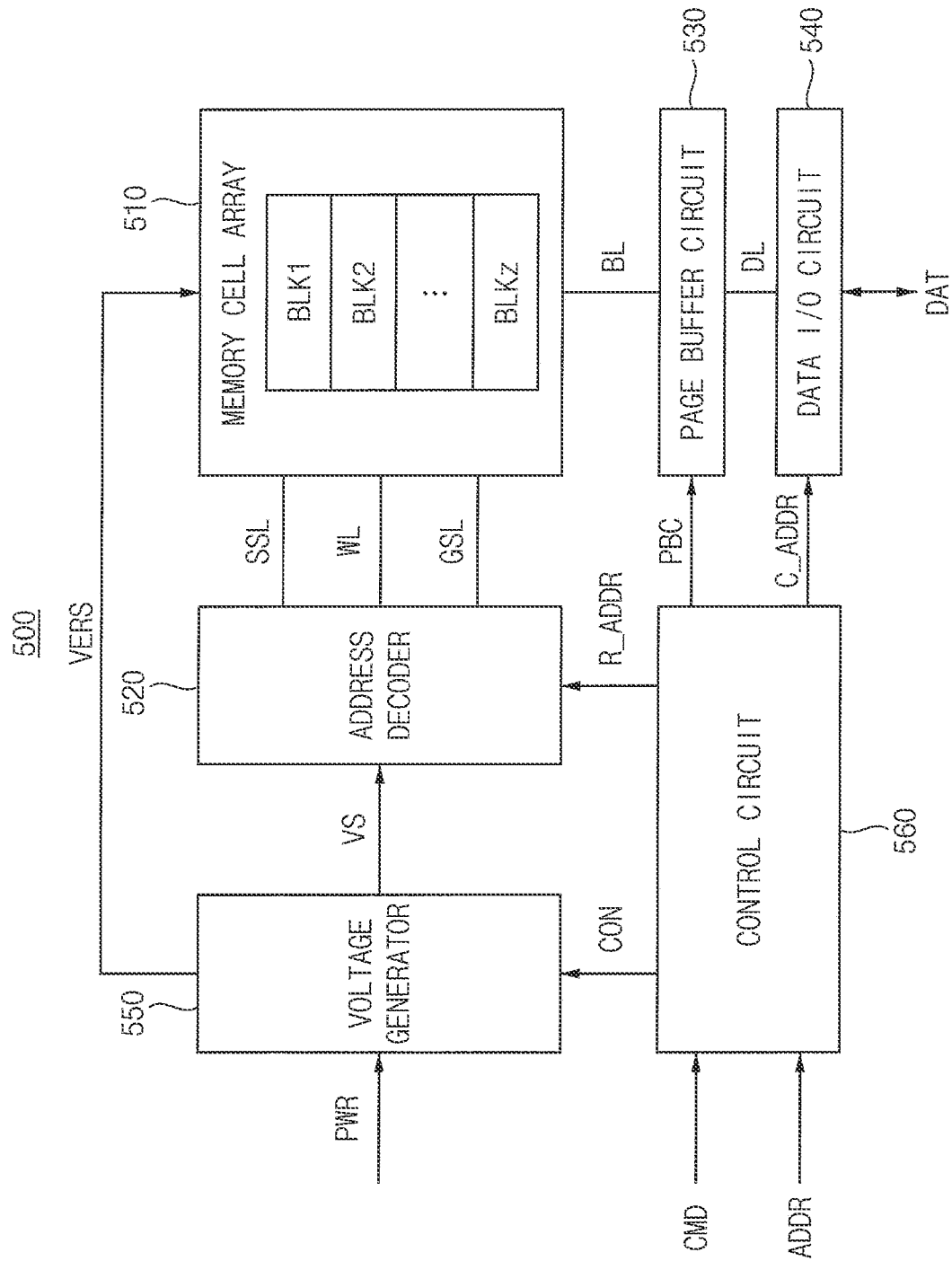
FIG. 19 is a block diagram illustrating an exemplary embodiment of a nonvolatile memory device included in a storage device according to such exemplary embodiments.

FIG. 19 is a block diagram illustrating an exemplary embodiment of a nonvolatile memory device included in a storage device according to such exemplary embodiments.

Referring to FIG. 19, a nonvolatile memory 500 includes a memory cell array 510, an address decoder 520, a page buffer circuit 530, a data I/O circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some exemplary embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 24.

The control circuit 560 receives a command CMD and an address ADDR from an external source (e.g., from the storage controller 310 in FIG. 2), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of a plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of a plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of a plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some exemplary embodiments, each page buffer may be connected to one bitline. In other exemplary embodiments, each page buffer may be connected to two or more bitlines.

The page buffer circuit 530 may store data DAT to be programmed into the memory cell array 510 or may read data DAT sensed (i.e., read) from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 externally of the nonvolatile memory 500, based on the column address C_ADDR.

Although the nonvolatile memory is described as based on a NAND flash memory, exemplary embodiments are not limited thereto, and the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 20:
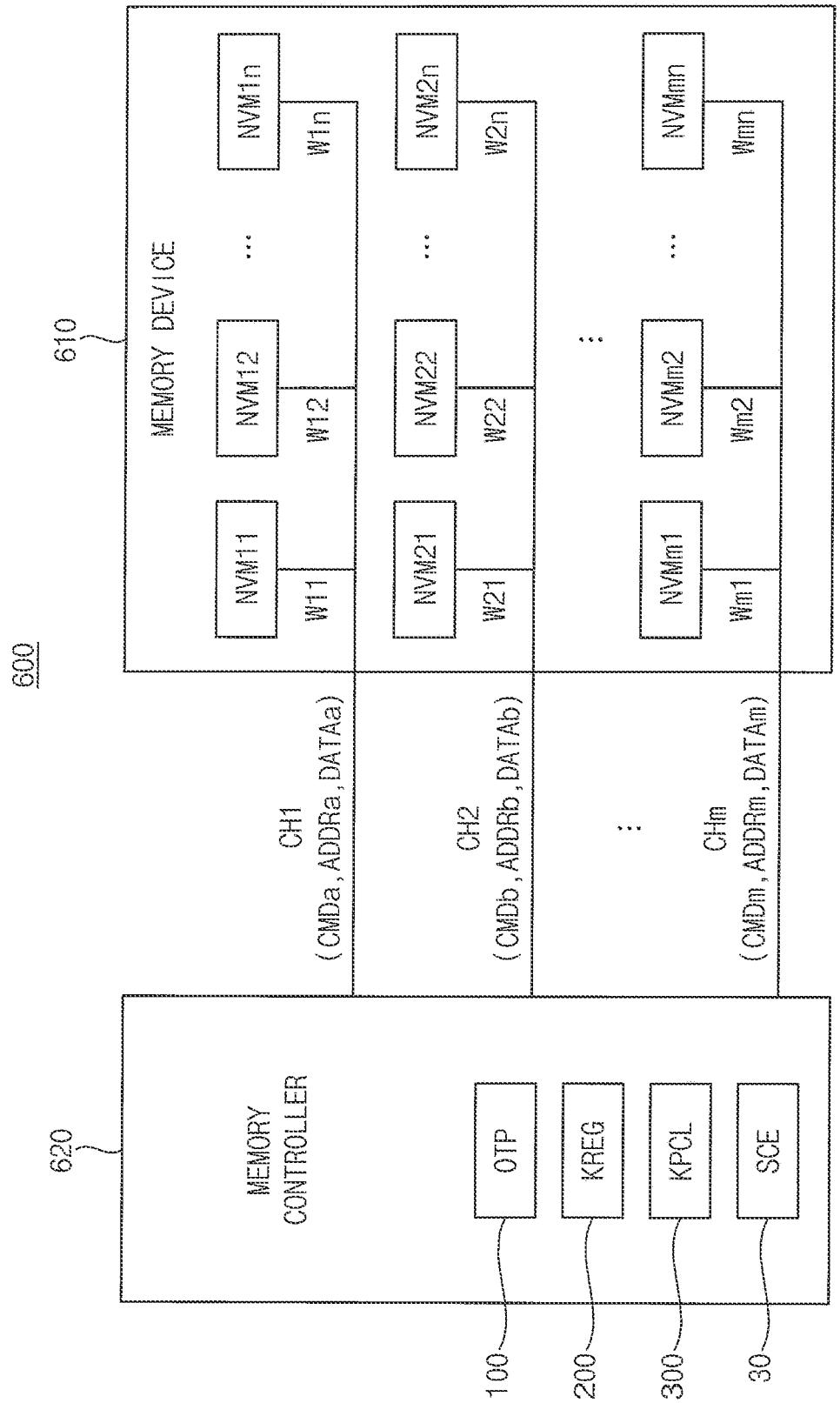
FIG. 20 is a block diagram illustrating a memory system including a nonvolatile memory device according to exemplary embodiments.

FIG. 20 is a block diagram illustrating a memory system including a nonvolatile memory device according to exemplary embodiments.

Referring to FIG. 20, a memory system 600 may include a memory device 610 and a memory controller 620. The memory system 600 may support a plurality of channels CH1, CH2, . . . , CHm, and the memory device 610 may be connected to the memory controller 620 through the plurality of channels CH1 to CHm. For example, the memory system 600 may be implemented as a storage device, such as a universal flash storage (UFS), a solid state drive (SSD), or the like.

The memory device 610 may include a plurality of nonvolatile memories NVM11, NVM12, . . . , NVM1n, NVM21, NVM22, . . . , NVM2n, NVMm1, NVMm2, . . . , NVMmn Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn. In some exemplary embodiments, each of the nonvolatile memories NVM11 to NVMmn may be implemented as a memory unit that may operate according to an individual command from the memory controller 620. For example, each of the nonvolatile memories NVM11 to NVMmn may be implemented as a chip or a die, but exemplary embodiments are not limited thereto.

The memory controller 620 may transmit and receive signals to and from the memory device 610 through the plurality of channels CH1 to CHm. For example, the memory controller 620 may correspond to the storage controller 310 in FIG. 2. For example, the memory controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm, or may receive the data DATAa to DATAm from the memory device 610 through the channels CH1 to CHm.

The memory controller 620 may select one of the nonvolatile memories NVM11 to NVMmn, which is connected to each of the channels CH1 to CHm, using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1n connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11 through the first channel CH1.

The memory controller 620 may transmit and receive signals to and from the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

According to exemplary embodiments, the memory controller 620 may include an OTP memory device 100, a key register KREG 200, a key protection control logic KPCL 300 and a security circuit SCE 30.

As described above, the OTP memory device 100 may store a secret value SCV, a key protection bit PRT indicating whether to protect the secret value SCV, and an end of life bit EOL indicating whether to discard the memory system 600 corresponding to the above-described semiconductor device. As described above with reference to FIG. 3, the memory system 600 may sequentially program the key protection bit PRT and the end of life bit EOL depending on a life cycle of the SSD device 5000, under control of an external host device. The key register 200 may load the secret value SCV from the OTP memory device 100 and store the secret value SCV. The key protection control logic 300 may control loading of the secret value SCV from the OTP memory device 100 to the key register 200 based on the key protection bit PRT and the end of life bit EOL.

The security circuit 30 may perform security functions such as authentication and encryption, under control of the security software executed by the memory controller 620. For example, the security circuit 30 may perform encryption and/or decryption of the data stored in the memory device 610, based on a secret key. The secret key may be the secret value SCV itself or the secret key may be generated based on the secret value SCV.

Although FIG. 20 illustrates an example where the memory device 610 communicates with the memory controller 620 through m channels and includes n nonvolatile memories corresponding to each of the channels, exemplary embodiments are not limited thereto and the number of channels and the number of nonvolatile memories connected to one channel may be variously changed.

Figure 21:
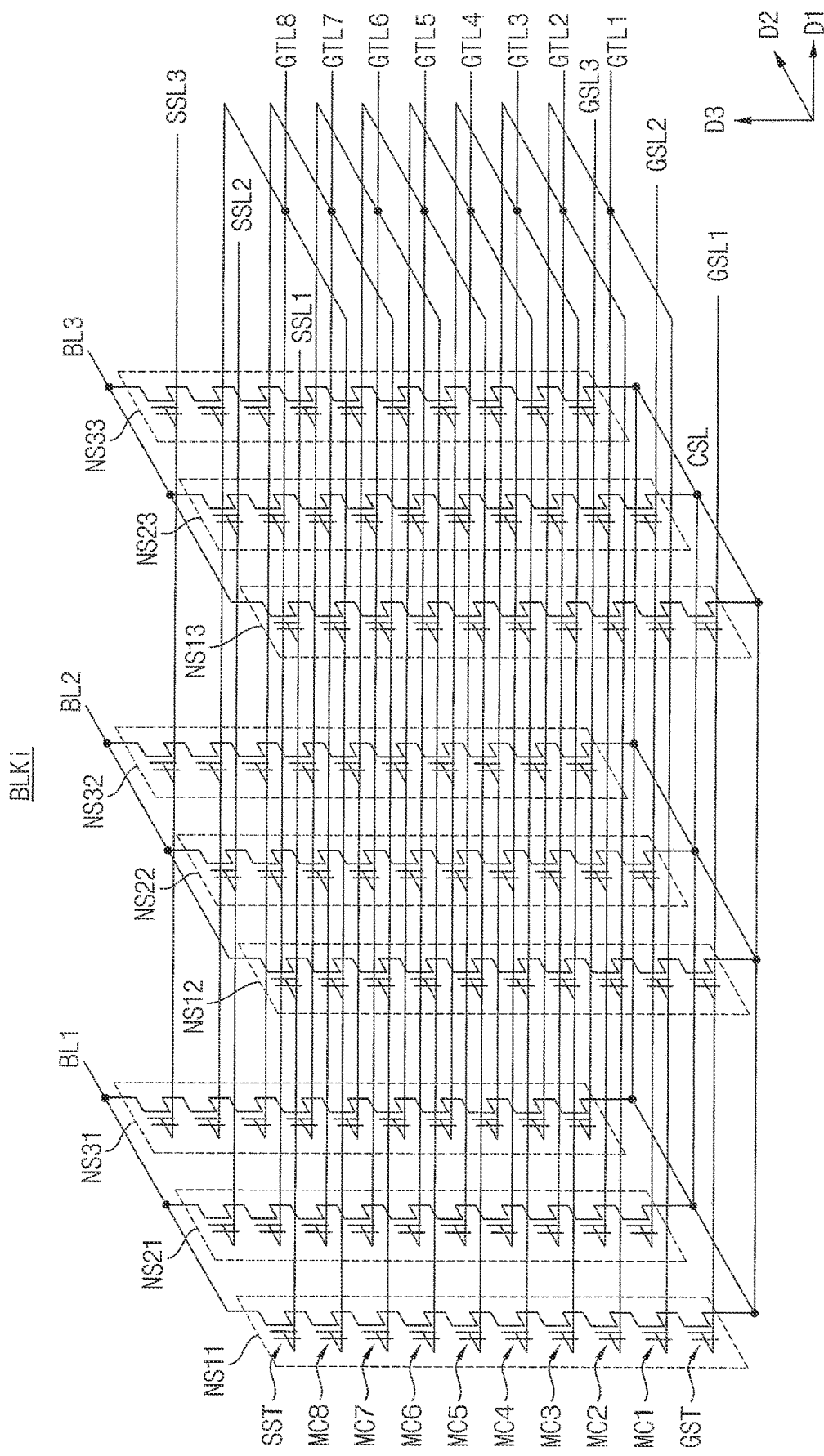
FIG. 21 is a circuit diagram illustrating an equivalent circuit of a memory block included in a storage device according to exemplary embodiments.

FIG. 21 is a circuit diagram illustrating an equivalent circuit of a memory block included in a storage device according to exemplary embodiments.

Referring to FIG. 21, each memory block BLKi included in the memory cell array 510 in FIG. 19 may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate.

The memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 21, each of the NAND strings NS11 to NS33 is illustrated to include eight memory cells MC1 to MC8. However, exemplary embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. In FIG. 21, the memory block BLKi is illustrated as being coupled to eight gate lines GTL1 to GTL8 and three bitlines BL1 to BL3. However, exemplary embodiments are not limited thereto, and each memory block in the memory cell array 510 may be coupled to various numbers of wordlines and various numbers of bitlines.

The unique device secret (UDS) according to the device identifier composition Engine (DICE) hardware requirements, which corresponds to the above-described secret value SCV, may be managed according to exemplary embodiments. A security algorithm such as authentication and encryption may be performed in a system on chip (SoC) or a storage device including a nonvolatile memory device and a secret key is used by the security algorithm. The secret key may be the secret value SCV itself stored in the OTP memory device or the secret key may be generated using the secret value SCV as a root key. Accordingly, the security of the secret value SCV is very important, and the DICE standard specifies the requirements for storing and accessing the secret value SCV.

According to the DICE standard, (i) the secret value SCV must not be written again (non-rewritable), (ii), only the DICE engine must have the right to access the secret value SCV, and (iii) the access to the secret value SCV must be blocked when the debugging port is activated.

In addition, the ISO/IEC 19790 section 7.11.8 specifies the requirements for the secure sanitization of the encryption module after the end of life, that is, a process of removing the sensitive information from the security module.

The conventional schemes may not satisfy the DICE requirements that the debugging device cannot access the UDS value stored in the OTP memory device, because the key value stored in the OTP memory device can be accessed in special cases such as a secure booting or enable of secure JTAG according to the conventional schemes. In addition, the conventional schemes do not address the protection of the secret key after the end of life of the semiconductor device.

According to exemplary embodiments, the key protection control logic may be designed using the key protection bit PRT, the end of life bit EOL and the loading permission signal LDP indicating the operation state of the semiconductor device, and the hardware device may be implemented such that the hardware device may satisfy the DICE requirements for the secret value and have the secure sanitization function by blocking the access to the secret value after the end of life of the semiconductor device.

As described above, the semiconductor device and the method of operating the semiconductor device according to exemplary embodiments may enhance security of the secret value and simultaneously optimize utilization of the secret value, using the key protection bit and the end of life bit that are stored in the OTP memory device. Furthermore, various security policies may be applicable and the secret value may be protected at the hardware level against undesirable exposure after the semiconductor device is discarded.

The exemplary embodiments may be applied to any electronic device and systems thereof. For example, the exemplary embodiments may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving device, etc.

The foregoing is illustrative of exemplary embodiments and is not to be construed as limiting thereof. Although a few exemplary embodiments have been described, those skilled in the art will readily appreciate that many modifications are possible in such exemplary embodiments without materially departing from the present inventive concept defined by the appended claims.

What is claimed is:

1. A semiconductor device comprising:
    a one-time programmable (OTP) memory device configured to store a secret value, a key protection bit indicating whether to protect the secret value, and an end of life bit indicating whether the semiconductor device is at an end of life stage;
    a key register configured to load the secret value from the OTP memory device and store the secret value;
    a key protection control logic configured to control loading of the secret value from the OTP memory device to the key register based on the key protection bit, the end of life bit, and a debugger attach signal;
    a debugging port configured to connect to a debugging device; and
    a debugging port protection logic configured to generate the debugger attach signal indicating whether the debugging device is connected to the debugging port.

2. The semiconductor device of claim 1, wherein the key protection bit and the end of life bit are sequentially programmed depending on a life cycle of the semiconductor device.

3. The semiconductor device of claim 2, wherein the life cycle of the semiconductor device includes a development stage to design, manufacture and test the semiconductor device, a usage stage to use the semiconductor device, and the end of life stage to discard the semiconductor device.

4. The semiconductor device of claim 3, wherein during the development stage, the key protection bit and the end of life bit have a first value that is initialized,
    wherein during the usage stage, the key protection bit has a second value that is programmed and the end of life bit maintains the first value, and
    wherein during the end of life stage, the key protection bit and the end of life bit have the second value.

5. The semiconductor device of claim 1, wherein the key protection control logic permits loading of the secret value from the OTP memory device to the key register regardless of an operational state of the semiconductor device, when the key protection bit and the end of life bit have a first value that is initialized.

6. The semiconductor device of claim 1, wherein the key protection control logic blocks loading of the secret value from the OTP memory device to the key register regardless of an operational state of the semiconductor device and a value of the key protection bit, when the end of life bit is programmed to a second value from a first value that is initialized.

7. The semiconductor device of claim 1, wherein the key protection control logic permits loading of the secret value from the OTP memory device to the key register based on activation of a loading permission signal indicating an operation state of the semiconductor device, when the key protection bit has a second value that is programmed and the end of life bit has a first value that is initialized.

8. The semiconductor device of claim 1, wherein the key protection control logic blocks loading of the secret value from the OTP memory device to the key register by deactivating a loading permission signal, when the debugger attach signal indicates that the debugging device is connected to the debugging port.

9. The semiconductor device of claim 1, wherein the key register is inaccessible through the debugging port.

10. The semiconductor device of claim 7, wherein the key protection control logic blocks loading of the secret value from the OTP memory device to the key register by deactivating the loading permission signal, when a read locking signal is activated.

11. The semiconductor device of claim 10, wherein the read locking signal is deactivated between a start time point of a booting sequence of the semiconductor device and an end time point of the booting sequence.

12. The semiconductor device of claim 1, wherein the key protection control logic generates a read enable signal based on the key protection bit, the end of life bit and a loading permission signal indicating an operation state of the semiconductor device, and
    wherein the OTP memory device reads the secret value to transfer the secret value to the key register, only when the read enable signal is activated.

13. The semiconductor device of claim 12, wherein the key protection control logic includes:
    a first inverter configured to invert the key protection bit to generate an inverted key protection signal;
    an OR gate configured to perform an OR logic operation on the loading permission signal and the inverted key protection signal;
    a second inverter configured to invert the end of life bit to generate an inverted end of life signal; and
    an AND gate configured to perform an AND logic operation on an output signal of the OR gate and the inverted end of life signal to generate the read enable signal.

14. The semiconductor device of claim 13, wherein the key protection control logic further includes:
    an NOR gate configured to perform an NOR logic operation on the debugger attach signal and a read locking signal to generate the loading permission signal, wherein the debugger attach signal is activated when the debugging device is connected to the debugging port of the semiconductor device and the read locking signal is deactivated between a start time point of a booting sequence of the semiconductor device and an end time point of the booting sequence.

15. A semiconductor device comprising:
    a one-time programmable (OTP) memory device configured to store a secret value, a key protection bit indicating whether to protect the secret value, and an end of life bit indicating whether the semiconductor device is at an end of life stage;
    a key register configured to load the secret value from the OTP memory device and store the secret value; and
    a key protection control logic configured to control loading of the secret value from the OTP memory device to the key register based on the key protection bit, the end of life bit and a loading permission signal indicating an operation state of the semiconductor device, wherein the key protection control logic is configured to block loading of the secret value from the OTP memory device to the key register by deactivating the loading permission signal based on a read locking signal being activated,
    wherein the key protection bit and the end of life bit are sequentially programmed depending on a life cycle of the semiconductor device.

16. The semiconductor device of claim 15, wherein the key protection bit and the end of life bit have a first value that is initialized during a development stage to design, manufacture and test the semiconductor device,
    wherein the key protection bit has a second value that is programmed and the end of life bit maintains the first value during a usage stage to use the semiconductor device, and wherein the key protection bit and the end of life bit have the second value during the end of life stage to discard the semiconductor device.

17. The semiconductor device of claim 15, wherein the key protection control logic blocks loading of the secret value from the OTP memory device to the key register regardless of the loading permission signal and a value of the key protection bit, when the end of life bit is programmed to a second value from a first value that is initialized.

18. A method of operating an semiconductor device, comprising:

storing, in a one-time programmable (OTP) memory device, a secret value, a key protection bit indicating whether to protect the secret value, and an end of life bit indicating whether the semiconductor device is at an end of life stage;

loading the secret value from the OTP memory device to store the secret value in a key register;

generating a debugger attach signal indicating whether a debugging device is connected to a debugging port of the semiconductor device; and controlling loading of the secret value from the OTP memory device to the key register based on the key protection bit, the end of life bit, and the debugger attach signal.

19. The method of claim 18, further comprising:

maintaining the key protection bit and the end of life bit to a first value that is initialized, during a development stage to design, manufacture and test the semiconductor device;

programming the key protection bit to a second value, during a usage stage to use the semiconductor device; and programming the end of life bit to the second value, during the end of life stage to discard the semiconductor device.

* * * * *